United States Patent
Zargari et al.

(10) Patent No.: US 10,924,025 B2
(45) Date of Patent: Feb. 16, 2021

(54) REGENERATIVE CASCADED H BRIDGE POWER SUPPLY

(71) Applicant: Rockwell Automation Technologies, Inc., Mayfield Heights, OH (US)

(72) Inventors: Navid R. Zargari, Cambridge (CA); Sarah Badawi, Hamilton (CA); Zhong Y. Cheng, Cambridge (CA); Mehdi Narimani, Oakville (CA); Ye Zhang, Oakville (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/698,392

(22) Filed: Nov. 27, 2019

(65) Prior Publication Data

US 2020/0343820 A1     Oct. 29, 2020

Related U.S. Application Data

(63) Continuation-in-part of application No. 16/393,613, filed on Apr. 24, 2019, now Pat. No. 10,651,760.

(51) Int. Cl.
*H02M 5/458* (2006.01)
*H01F 30/14* (2006.01)
*H02M 5/45* (2006.01)

(52) U.S. Cl.
CPC .......... *H02M 5/4585* (2013.01); *H01F 30/14* (2013.01); *H02M 5/4505* (2013.01)

(58) Field of Classification Search
CPC ............ H02M 5/40; H02M 5/42; H02M 5/44; H02M 5/443; H02M 5/45; H02M 5/4505;
(Continued)

(56) References Cited

U.S. PATENT DOCUMENTS

2013/0093376 A1    4/2013  Yoo
2015/0236603 A1*   8/2015  Jimichi ............... H02M 7/49
                                                        363/37
(Continued)

OTHER PUBLICATIONS

PM Lacasse, "A hierarchical, fuzzy inference approach to data Itration and feature prioritization in the connected manufacturing enterprise", Journal of Big Data, 2018, pp. 1-31.
(Continued)

*Primary Examiner* — Bryan R Perez
(74) *Attorney, Agent, or Firm* — Kunzler Bean & Adamson

(57) ABSTRACT

For a power supply with a reduced number of semiconductor devices, a transformer receives a three-phase primary voltage and steps the three-phase primary voltage up or down to a secondary voltage with a plurality of secondary winding sets to a plurality of first phase voltages, a plurality of second phase voltages, and a plurality of third phase voltages. A plurality of power cell sets each include a plurality of power cells cascaded connected. Each power cell comprises a rectifier and an inverter. The rectifier includes two first active switches that are serially connected and receive a phase voltage at a first switch midpoint, two second active switches that are serially connected and receive another phase voltage at a second switch midpoint, and two capacitors that are serially connected and receive another phase voltage at a capacitor midpoint between the capacitors.

19 Claims, 41 Drawing Sheets

(58) Field of Classification Search
CPC ...... H02M 5/451; H02M 5/452; H02M 5/458; H02M 5/4585; H01F 30/14
See application file for complete search history.

(56) References Cited

U.S. PATENT DOCUMENTS

2015/0295491 A1  10/2015  Lenz et al.
2016/0322916 A1* 11/2016  Hao .................... H02M 7/48
2017/0110977 A1   4/2017  Mihalache

OTHER PUBLICATIONS

European Patent Office, "Extended European Search Report", EPO, dated Sep. 17, 2020, p. 1-9.
M. Malinowski et al., "A Survey on Cascaded Multilevel Inverters", IEEE Transactions on Industrial Electronics, vol. 57, No. 7, Jul. 2010, pp. 1-10.
P. Lezana et al., "Novel Cell Based on Reduced Single-Phase Active Front End for Multicell Converters", IEEE, Jan. 16, 2006, pp. 733-738.
J. Rodriguez et al., "Topologies for Regenerative Cascaded Multi-level Inverters", IEEE Xplore, Aug. 4, 2003, pp. 519-524.

* cited by examiner

US 10,924,025 B2

REGENERATIVE CASCADED H BRIDGE POWER SUPPLY

CROSS-REFERENCE TO RELATED APPLICATIONS

This is a continuation-in-part application of and claims priority to U.S. patent application Ser. No. 16/393,613 entitled "REDUCED SEMICONDUCTOR DEVICE POWER CELL VOLTAGE DRIVE" and filed on Apr. 24, 2019 for Zhong Y. Cheng, which is incorporated herein by reference.

BACKGROUND INFORMATION subject matter disclosed herein relates to power supplies and more particularly to regenerative cascaded H bridge power supplies.

BRIEF DESCRIPTION

A power supply based on cascaded power cells with a reduced number of semiconductor devices is disclosed. The power supply includes a transformer and a plurality of power cell sets. The transformer receives a three-phase primary voltage and steps the three-phase primary voltage up or down to a secondary voltage with a plurality of secondary winding sets to a plurality of first phase voltages, a plurality of second phase voltages, and a plurality of third phase voltages. The plurality of power cell sets each comprise a plurality of power cells cascaded connected. Each power cell comprises a rectifier and an inverter. The rectifier comprises two first active switches that are serially connected and receive a phase voltage at a first switch midpoint, two second active switches that are serially connected and receive another phase voltage at a second switch midpoint, and two capacitors that are serially connected and receive another phase voltage at a capacitor midpoint between the capacitors. The two first active switches, the second two first active switches, and the two capacitors of each power cell are connected in parallel. An apparatus and a drive also perform the functions of the power supply.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

Figure 1A:
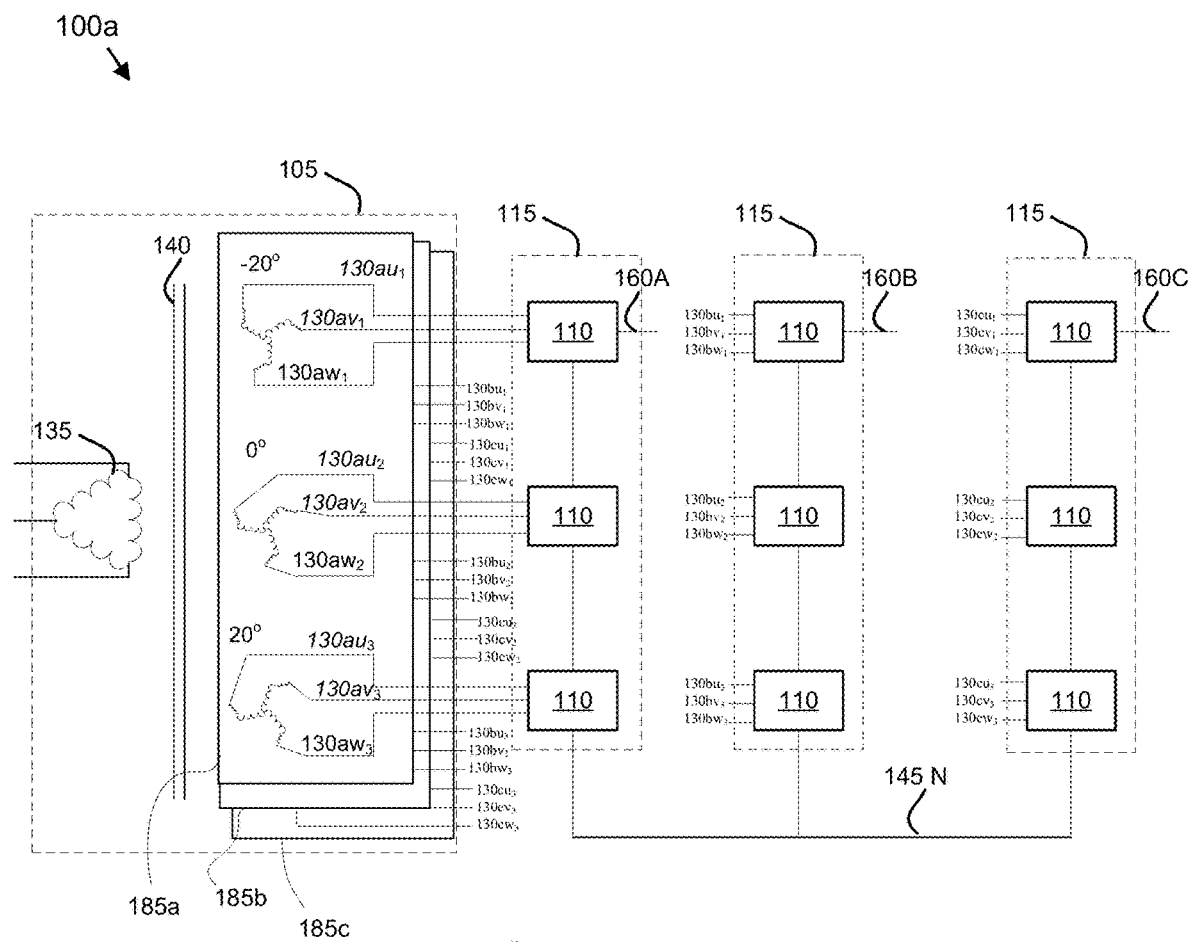
FIG. 1A is a schematic diagram of a power supply according to an embodiment.

FIG. 1A is a schematic diagram of a power supply 100a. The power supply 100a supplies a three-phase AC output with variable voltage and frequency to the load. The AC output may drive one or more motors as the load. The power supply 100a includes a phase shifting transformer 105 and a plurality of power cell sets 115.

In the depicted embodiment, the phase shifting transformer 105 includes primary winding 135, a core 140, and a plurality of secondary winding sets 130. The primary winding 135 of the phase shifting transformer 105 receives the three-phase primary voltage. The plurality of secondary winding sets 130 are magnetically coupled with the primary winding 135 and step the three-phase primary voltage up or down to a secondary voltage. In one embodiment, there is phase shifting between the different secondary winding sets 130. The transformer 105 is shown with Delta (Δ) connected primary winding 135 and zigzag connected secondary winding sets 130. It can also be Wye (Y) connected primary winding 135 and extended-Delta (Δ) secondary winding set 130, or polygon connected secondary winding set 130.

In the depicted embodiment, the phase shifting transformer 105 comprises 9 secondary winding sets 130 with 20 degree phase shifts among the voltage provided by the top three secondary winding sets 130a, the middle three secondary winding sets 130b, and the bottom three secondary winding sets 130c as indicated in FIG. 1A. each secondary winding set 130 provide the secondary voltage with the specified phase to the power cell sets 115.

In this embodiment, an exemplary 9 power cells circuit is shown. The number of power cells 110 may change depending on the requirement of the output voltage, thus the number of secondary winding sets 130 for each power cell set 115 will change accordingly. Generally speaking, the same circuit topology can be used for any number n of power cells 110 in series in each power cell set 115, and there will be the same amount of secondary winding sets 130 feeding each of the power cells 110. The phase shifting angles shown in FIG. 1A is also exemplary for n=3. These angles can be changed. In general, for n secondary winding sets 130 feeding n power cells 110 of each three-phase power cell set 115A-C, the phase shift angle within each set is 60°/n, or 20°/n. For example, if n=4, the phase shift angle of the transformer secondary windings 130 for each power cell set 115 is 60°/4=15°, or 20°/4=5°. If n=5, the phase shift angle will be 60°/5=12°, or 20°/5=4°, and so on.

The plurality of power cell sets 115 each comprise a plurality of power cells 110 that are cascaded connected. Each power cell 110 receives one of a single phase and a three-phase voltage of a distinct secondary winding set 130 of the phase shifting transformer 105. Each power cell set 115 generates one phase 160A-C of a three-phase AC output.

The power cells 110 include a plurality of semiconductor devices to rectify and invert the voltage received from a secondary winding set 130 into a phase 160A-C of the three-phase AC output. As more semiconductor devices are used in the power cells 110, the cost and size of the power cells 110 and the power supply 100a are increased. The embodiments reduce the number of semiconductor devices in the power cells 110 and/or power supply 100 to reduce the cost and size of the power supply 100. In one embodiment, each power cell 110 comprises no more than eight power semiconductor devices. The power supply 100 is organized to provide the AC output with the reduced number of power semiconductor devices, resulting in significant cost savings.

Figure 1B:
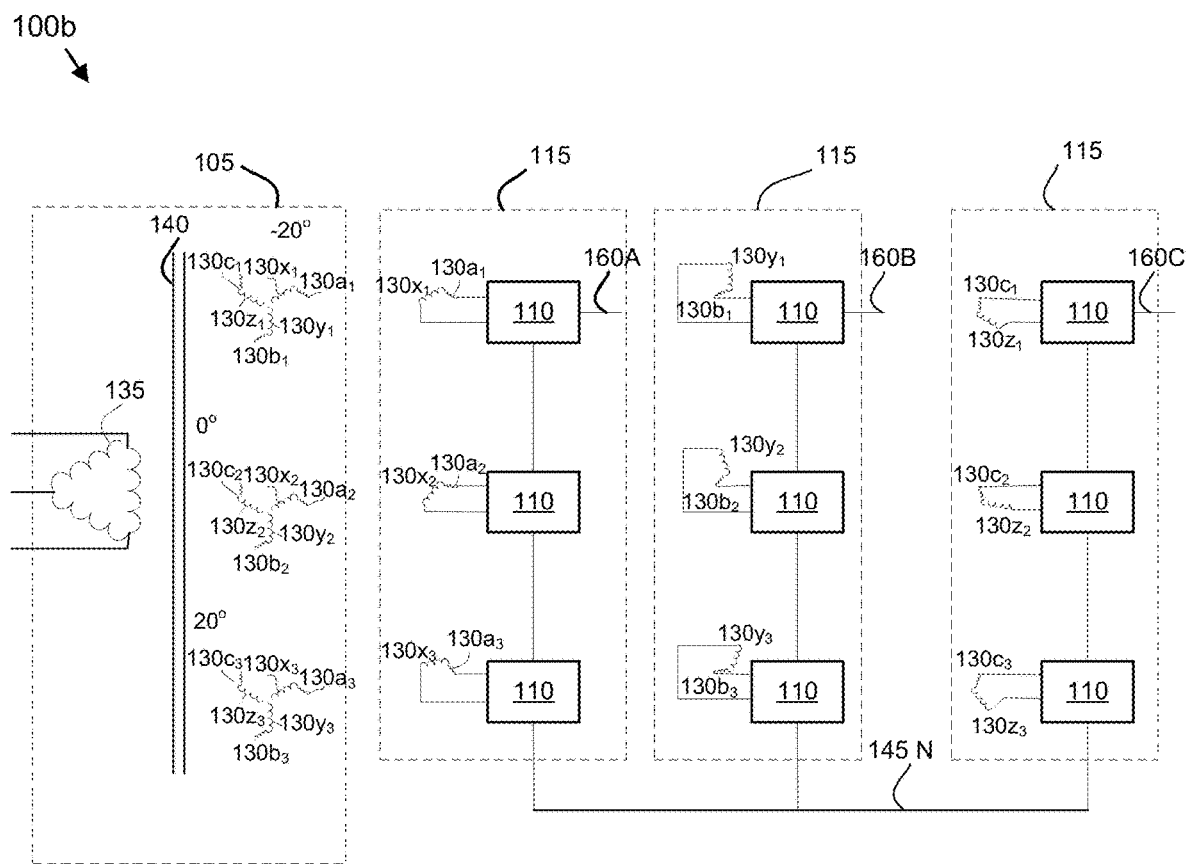
FIG. 1B is a schematic diagram of a power supply according to an alternate embodiment.

FIG. 1B is an exemplary schematic diagram of a power supply 100b. In the depicted embodiment, the phase shifting transformer 105 comprises 3 secondary winding sets 130 with 20-degree phase shifts among the voltage provided each secondary winding set 130. It differs from FIG. 1A in that the three phase secondary winding sets are terminated in such way that single phase power can be provided to the power cells, thus the number of three-phase secondary windings is ⅓ comparing to FIG. 1A.

In this embodiment, an exemplary 9 power cells circuit is shown. The number of power cells may change depending on the requirement of the output voltage, thus the number of secondary windings 130 for each power cell set 115 will change accordingly. Generally speaking, the same circuit topology can be used for any number n of power cells 110 in series in each power cell set 115, and there will be the same amount of secondary windings 130 feeding each of the power cells 110. The phase shifting angles shown in FIG. 1A is also exemplary for n=3. These angles may be changed. In general, for n secondary windings 130 feeding n power cells 110 of each three-phase power cell set 115A-C, the phase shift angle within each power cell set 115 is 60°/n. For example, if n=4, the phase shift angle of the transformer secondary windings 130 for each power cell set 115 is 60°/4=15°. If n=5, the phase shift angle will be 60°/5=12°, and so on.

The topologies shown in FIG. 1A and FIG. 1B will be applied to the power cells depicted later. Exemplary n=3 power cells per set are used to demonstrate the circuit topology. In real implementation n can be any natural number.

Figure 1C:
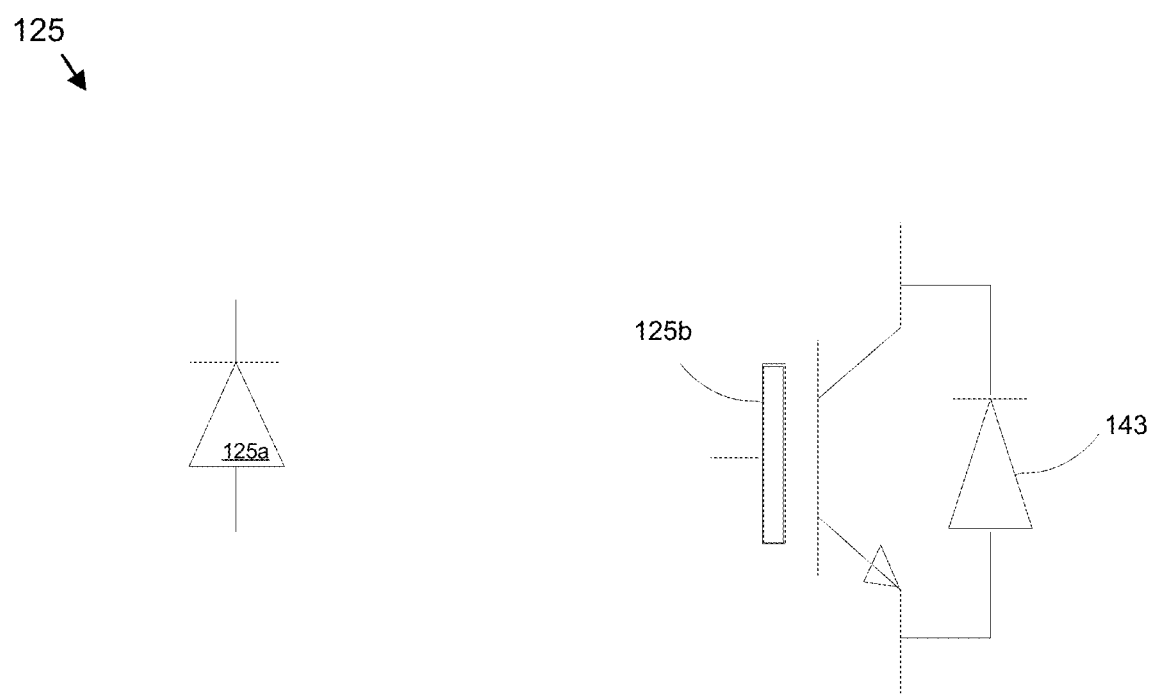
FIG. 1C is a schematic diagram of power semiconductor devices according to an embodiment.

FIG. 1C is a schematic diagram of power semiconductor devices 125. As used herein, a power semiconductor device 125 is one of a diode 125a and an active switch 125b. The diode 125a may also be a thyristor, or other active semiconductor switches. The active switch 125b may be an Insulated Gate Bipolar Transistor (IGBT) 125b. In one embodiment, the active switch 125b is field effect transistor (FET) 125b. The active switch 125b may be a metal-oxide semiconductor field-effect transistor (MOSFET) 125b or integrated gate commuted thyristor (IGCT). The active switch 125b may be other semiconductor switching devices such as silicon controlled rectifiers (SCR). The quantity of semiconductor switches is counted from circuit principle point of view. Semiconductor devices connected in parallel or series are count as single functional device. Each active switch 125b may comprise an anti-parallel diode 143. A power cell 110 may have no more than eight power semiconductor devices 125. In one embodiment, the no more than eight power semiconductor devices 125 are organized as a rectifier 150 and an inverter 155 within the power cell 110. The rectifier 150 may selectively modify the direction of an input current. The inverter 155 may form the required AC output. In one embodiment, a power cell 110 includes additional non-power semiconductor devices such as capacitors, connectors, connections, and the like. The numbers of non-power semiconductor devices may not be reduced.

Figure 2A:
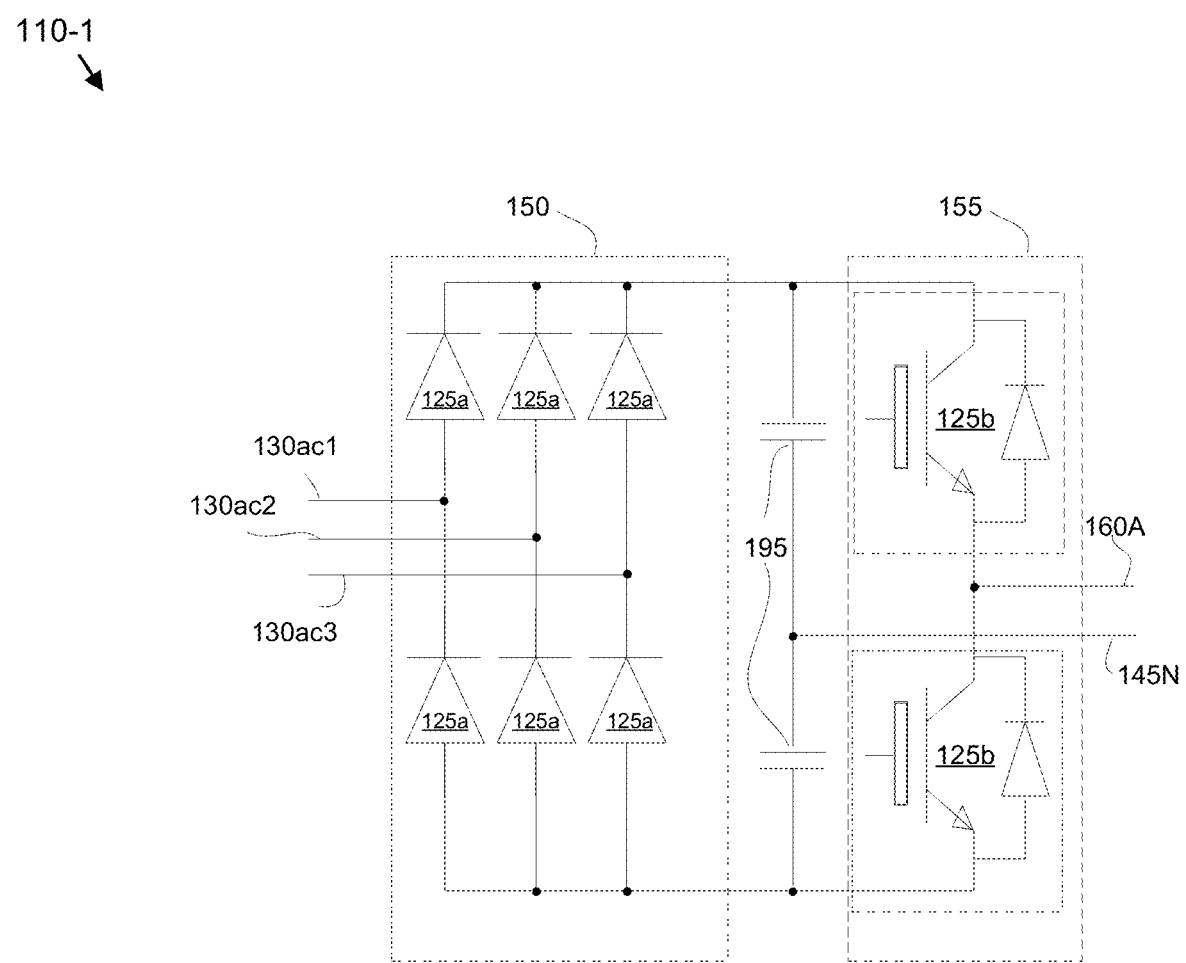
FIG. 2A is a schematic diagram of a power cell with a six-device rectifier and a two-device inverter according to an embodiment.

FIG. 2A is a schematic diagram of a power cell 110-1 with a six-power semiconductor device rectifier 150 and a two-power semiconductor device inverter 155. In the depicted embodiment, the power cell 110-1 comprises a rectifier 150 and an inverter 155. The rectifier 150 comprises six diodes 125a. The rectifier 150 is connected to one secondary winding set 130ac1-3. The inverter 155 comprises two IGBTs 125b that output a phase of the three-phase AC output and a neutral 145N. Two non-power semiconductor device capacitors 195 are also shown.

Figure 2B:
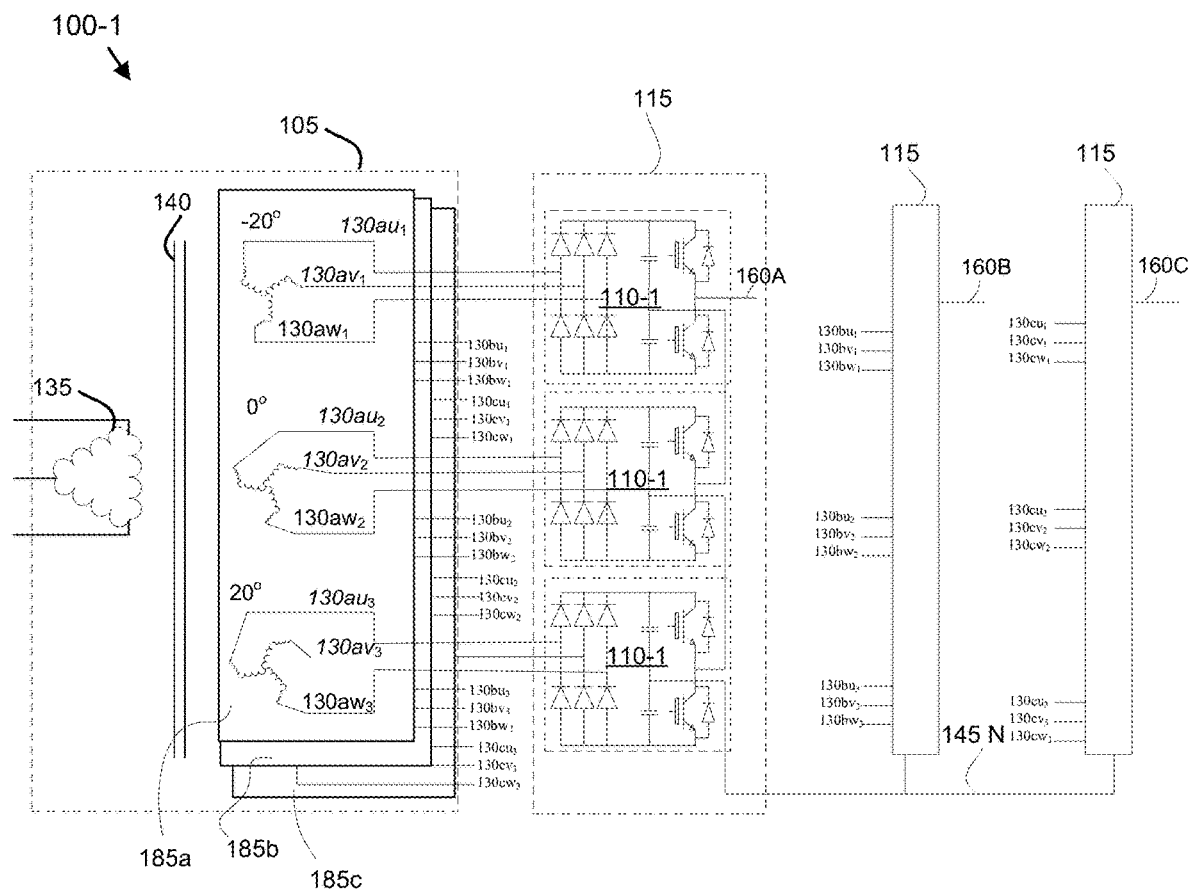
FIG. 2B is a schematic diagram of a power supply with power cells with a six-device rectifier and a two-device inverter according to an embodiment.

FIG. 2B is a schematic diagram of a power supply 100a of FIG. 1A with power cells 110-1 of FIG. 2A with a six-power semiconductor device rectifier 150 and a two-power semiconductor device inverter 155. In the depicted embodiment, each phase of the three-phases of the secondary winding sets 130 comprises three multiphase sections 185. The rectifier 150 of each power cell 110-1 comprises six diodes 125a. The inverter 155 of each power cell 110-1 comprises two IGBTs 125b. For clarity, one power cell set 115 is fully displayed and the two other power cell sets 115 are schematically displayed.

Figure 3A:
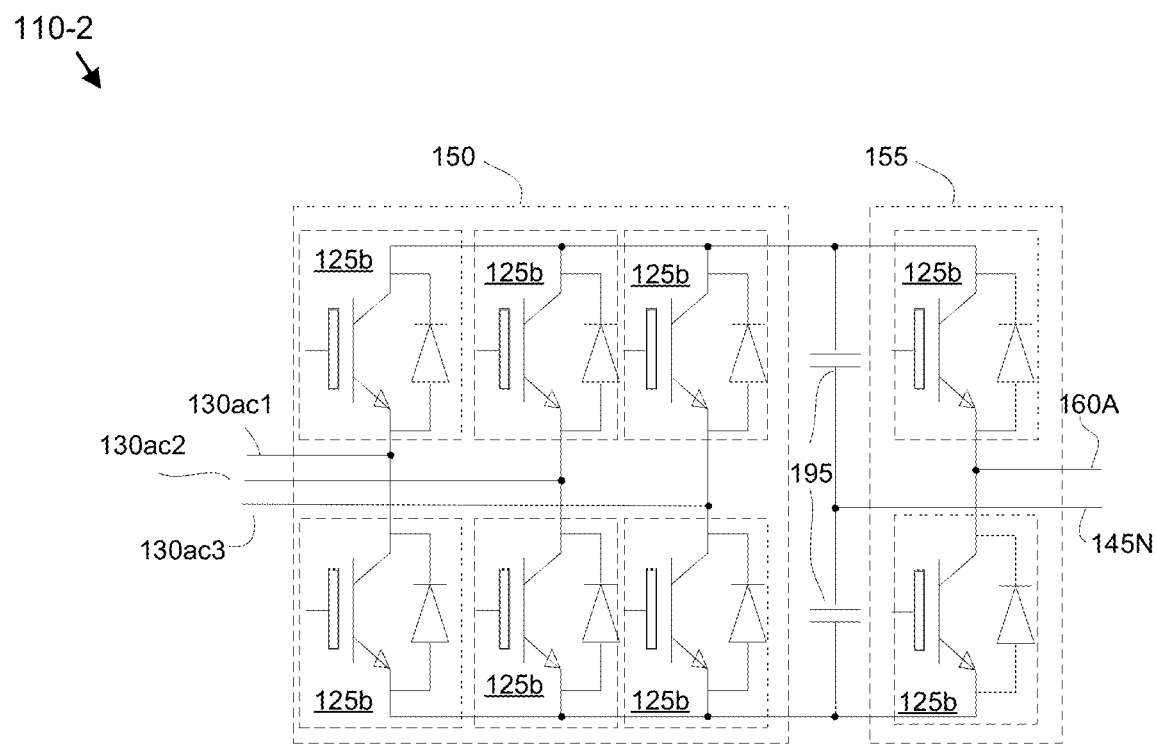
FIG. 3A is a schematic diagram of a power cell with a six-device rectifier and a two-device inverter according to an alternate embodiment.

FIG. 3A is a schematic diagram of a power cell 110-2 with a six-power semiconductor device rectifier 150 and a two-power semiconductor device inverter 155. In the depicted embodiment, the power cell 110-2 comprises a rectifier 150 and an inverter 155. The rectifier 150 comprises six IGBTs 125b. The rectifier 150 is connected to one secondary winding set 130ac1-3. The inverter 155 comprises two IGBTs 125b that output a phase 160A-C of the three-phase AC output and a neutral 145N. Two non-power semiconductor device capacitors 195 are also shown.

Figure 3B:
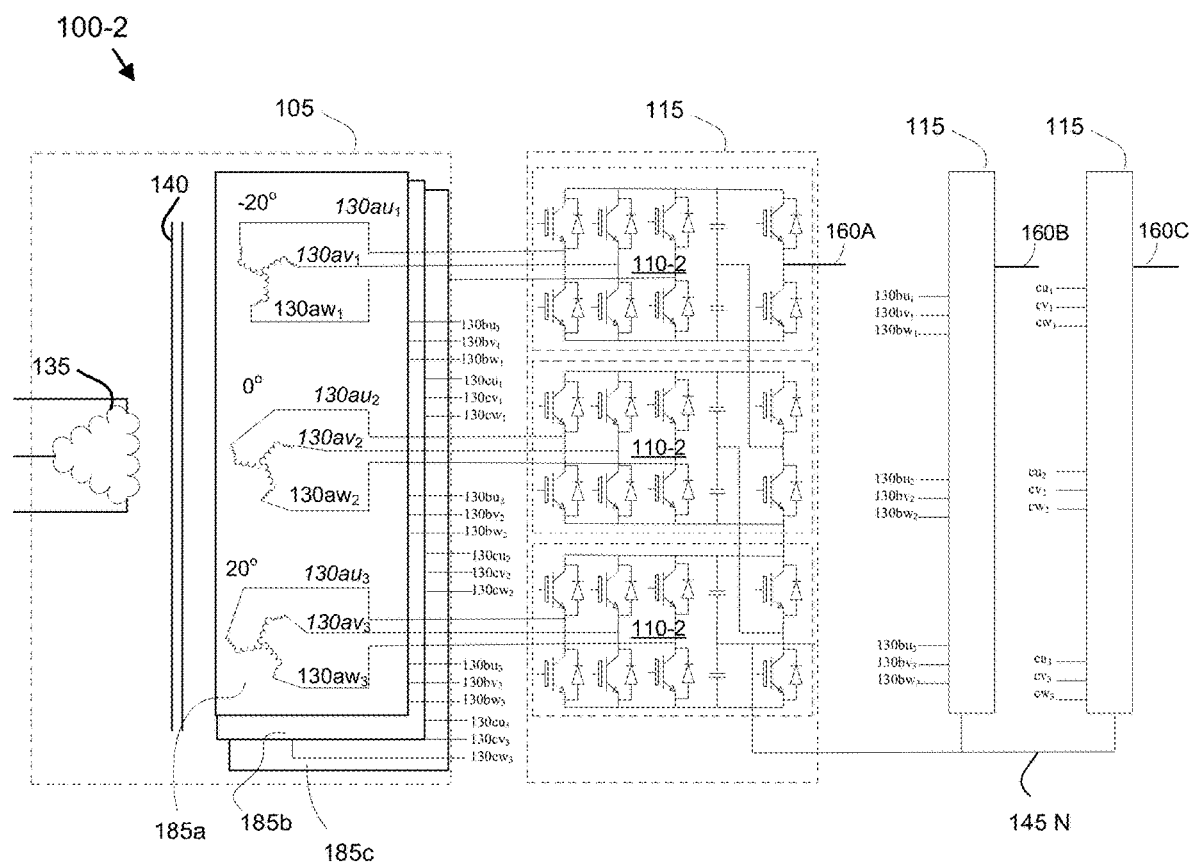
FIG. 3B is a schematic diagram of a power supply with power cells with a six-device rectifier and a two-device inverter according to an alternate embodiment.

FIG. 3B is a schematic diagram of a power supply 100a of FIG. 1A with power cells 110-2 of FIG. 3A with a six-semiconductor power device rectifier 150 and a two-semiconductor power device inverter 155. Each phase of the three-phases of the secondary winding sets 130 comprises three multiphase sections 185. The rectifier 150 of each power cell 110-2 comprises six IGBTs 125b. The inverter 155 of each power cell 110-2 comprises two IGBTs 125b. For clarity, one power cell set 115 is fully displayed and the two other power cell sets 115 are schematically displayed.

Figure 4A:
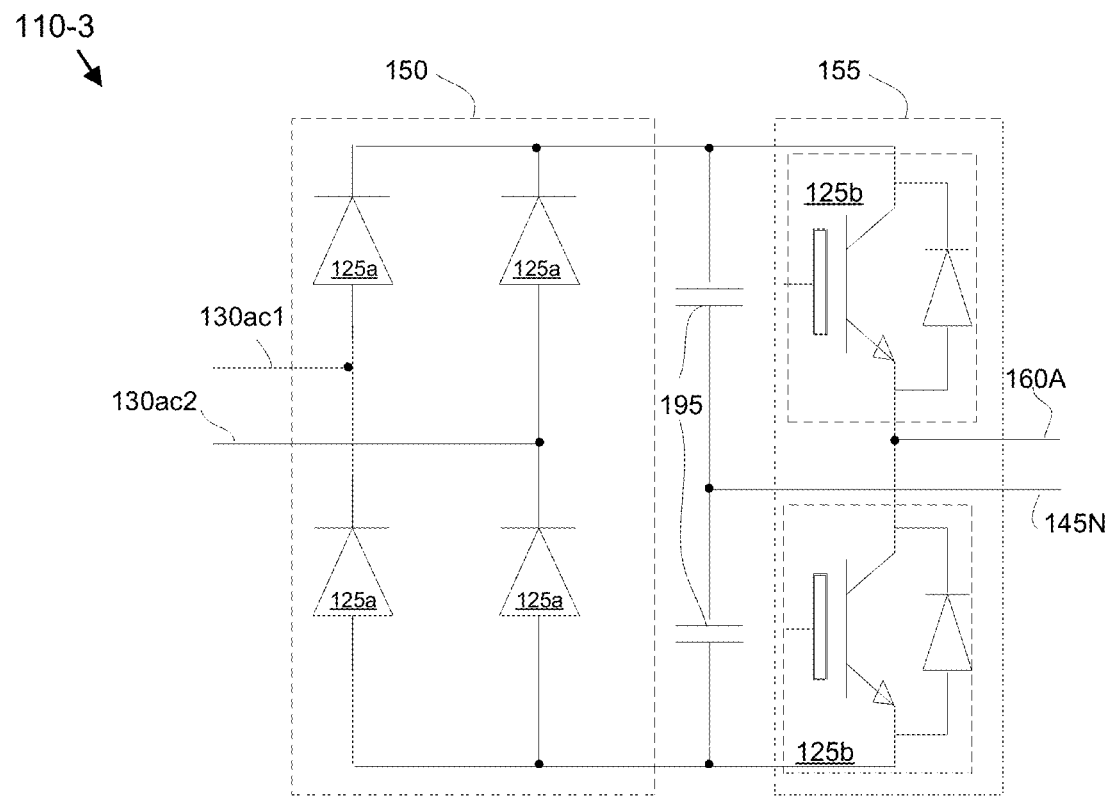
FIG. 4A is a schematic diagram of a power cell with a four-device rectifier and a two-device inverter according to an embodiment.

FIG. 4A is a schematic diagram of a power cell 110-3 with a four-semiconductor power device rectifier 150 and a two-semiconductor power device inverter 155. In the depicted embodiment, the power cell 110-3 comprises a rectifier 150 and an inverter 155. The rectifier 150 comprises four diodes 125a. The rectifier 150 is connected to one secondary winding set 130ac1-2. The inverter 155 comprises two IGBTs 125b that output a phase 160A-C of the three-phase AC output and a neutral 145N. Two non-power semiconductor device capacitors 195 are also shown.

Figure 4B:
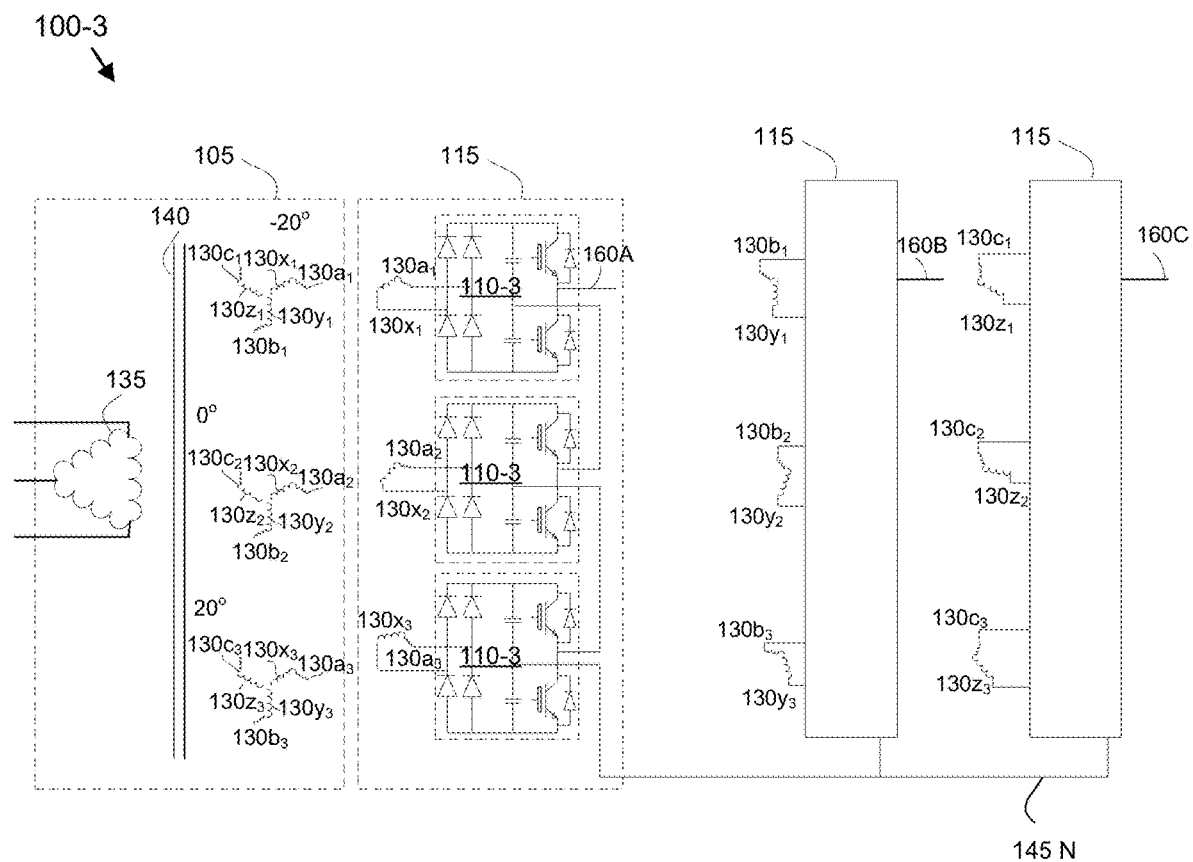
FIG. 4B is a schematic diagram of a power supply with power cells with a four-device rectifier and a two-device inverter according to an embodiment.

FIG. 4B is a schematic diagram of a power supply 110b of FIG. 1B with power cells 110-3 of FIG. 4A with a four-semiconductor power device rectifier 150 and a two-semiconductor power device inverter 155. The phase shifting transformer 105 comprises 3 secondary winding sets 130 with 20-degree phase shifts among the voltage provided each secondary winding set 130. The rectifier 150 of each power cell 110-3 comprises four diodes 125a. The inverter 155 of each power cell 110-3 comprises two IGBTs 125b. For clarity, one power cell set 115 is fully displayed and the two other power cell sets 115 are schematically displayed.

Figure 5A:
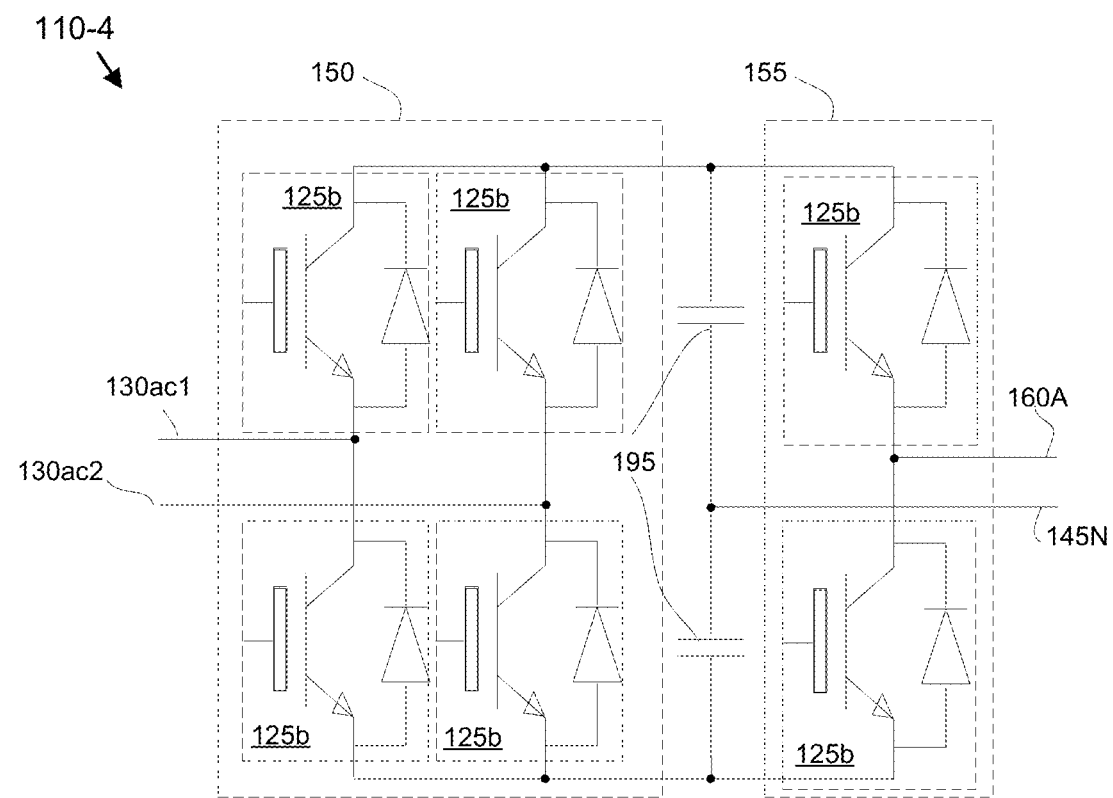
FIG. 5A is a schematic diagram of a power cell with a four-device rectifier and a two-device inverter according to an alternate embodiment.

FIG. 5A is a schematic diagram of a power cell 110-4 with a four-semiconductor power device rectifier 150 and a two-semiconductor power device inverter 155. In the depicted embodiment, the power cell 110-4 comprises a rectifier 150 and an inverter 155. The rectifier 150 comprises four IGBTs 125b. The rectifier 150 is connected to one secondary winding set 130ac1-2. The inverter 155 comprises two IGBTs 125b that output a phase 160A-C of the three-phase AC output and a neutral 145N. Two non-power semiconductor device capacitors 195 are also shown.

Figure 5B:
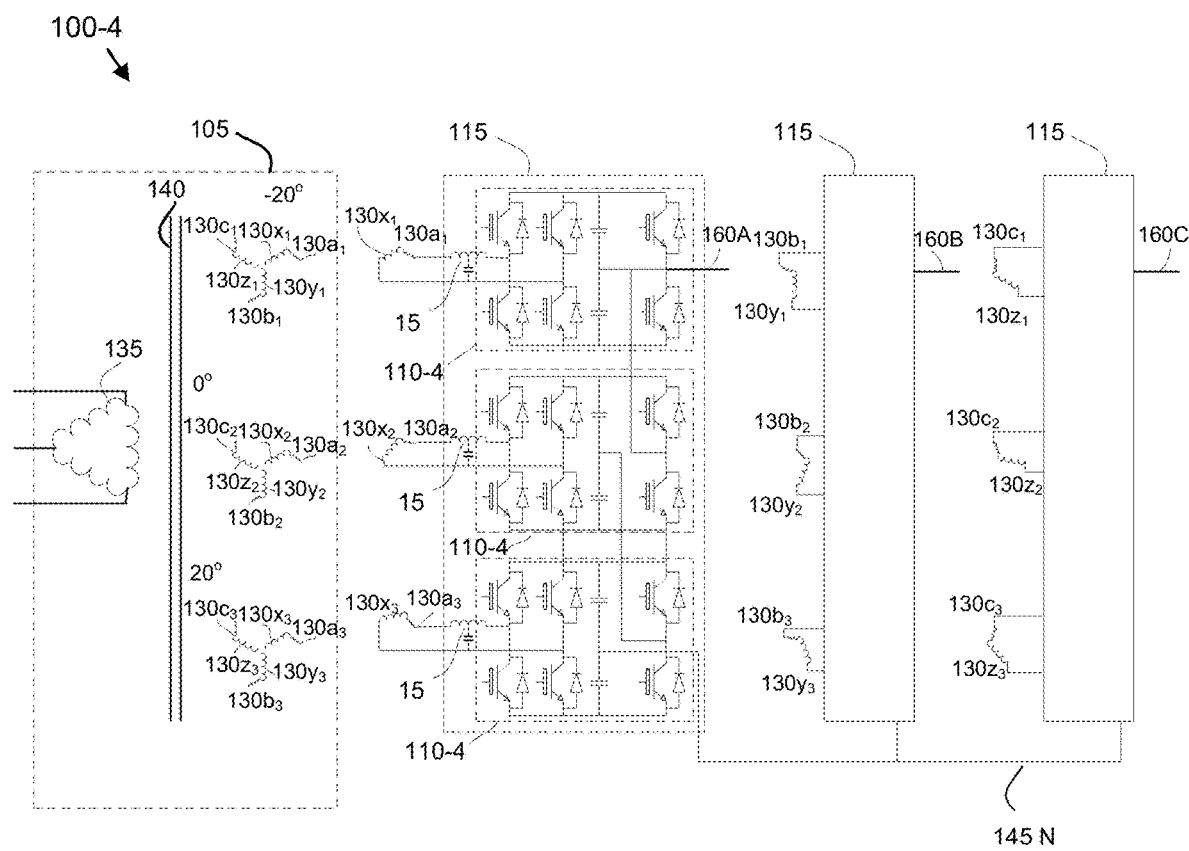
FIG. 5B is a schematic diagram of a power supply with power cells with a four-device rectifier and a two-device inverter according to an alternate embodiment.

FIG. 5B is a schematic diagram of a power supply 100b of FIG. 1B with power cells 110-4 of FIG. 5A with a four-semiconductor power device rectifier 150 and a two-semiconductor power device inverter 155. In the depicted embodiment, the rectifier 150 of each power cell 110-4 comprises four IGBTs. The inverter 155 of each power cell 110-4 comprises two IGBTs 125b. In addition, each power cell 110-4 comprises an LCL filter 15 that filters the current from the secondary winding set 130. For clarity, one power cell set 115 is fully displayed and the two other power cell sets 115 are schematically displayed.

Figure 6A:
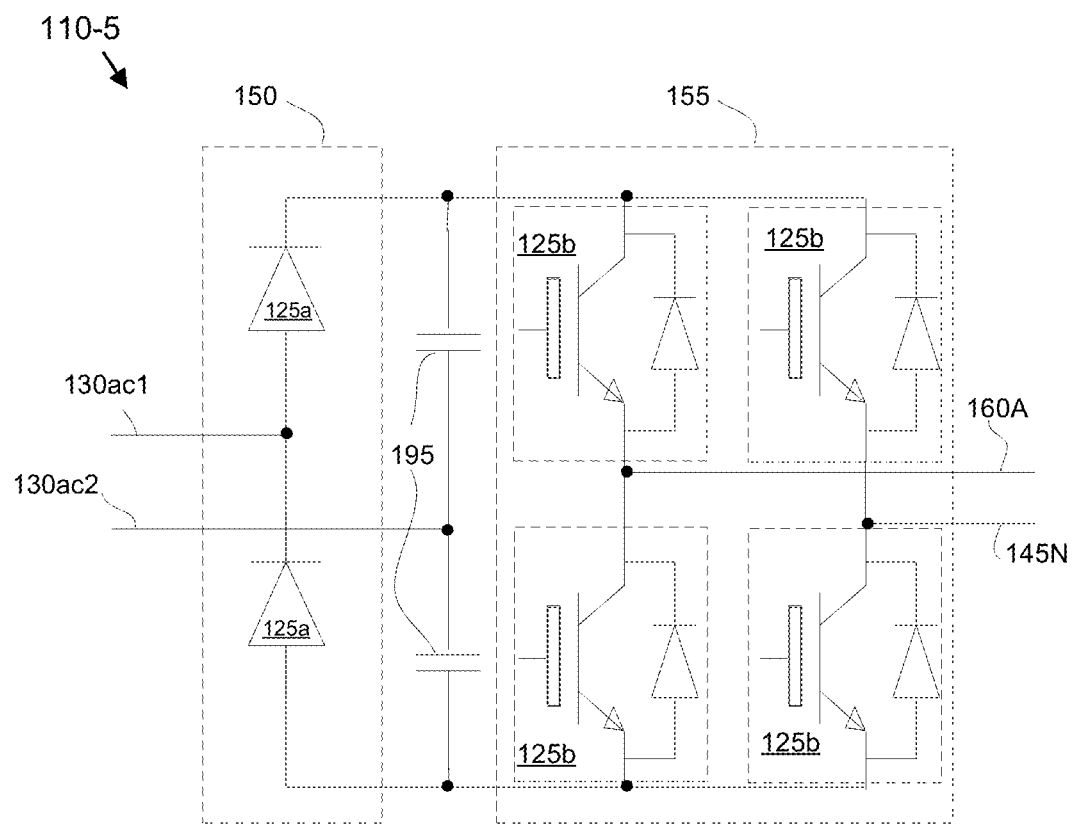
FIG. 6A is a schematic diagram of a power cell with a two-device rectifier and a four-device inverter according to an embodiment.

FIG. 6A is a schematic diagram of a power cell 110-5 with a two-semiconductor power device rectifier 150 and a four-semiconductor power device inverter 155. In the depicted embodiment, the power cell 110 comprises a rectifier 150 and an inverter 155. The rectifier 150 comprises two diodes 125a. The rectifier 150 is connected to one secondary winding set 130ac1-2. The inverter 155 comprises four IGBTs 125b that output a phase 160A-C of the three-phase AC output and a neutral 145N. Two non-power semiconductor device capacitors 195 are also shown.

Figure 6B:
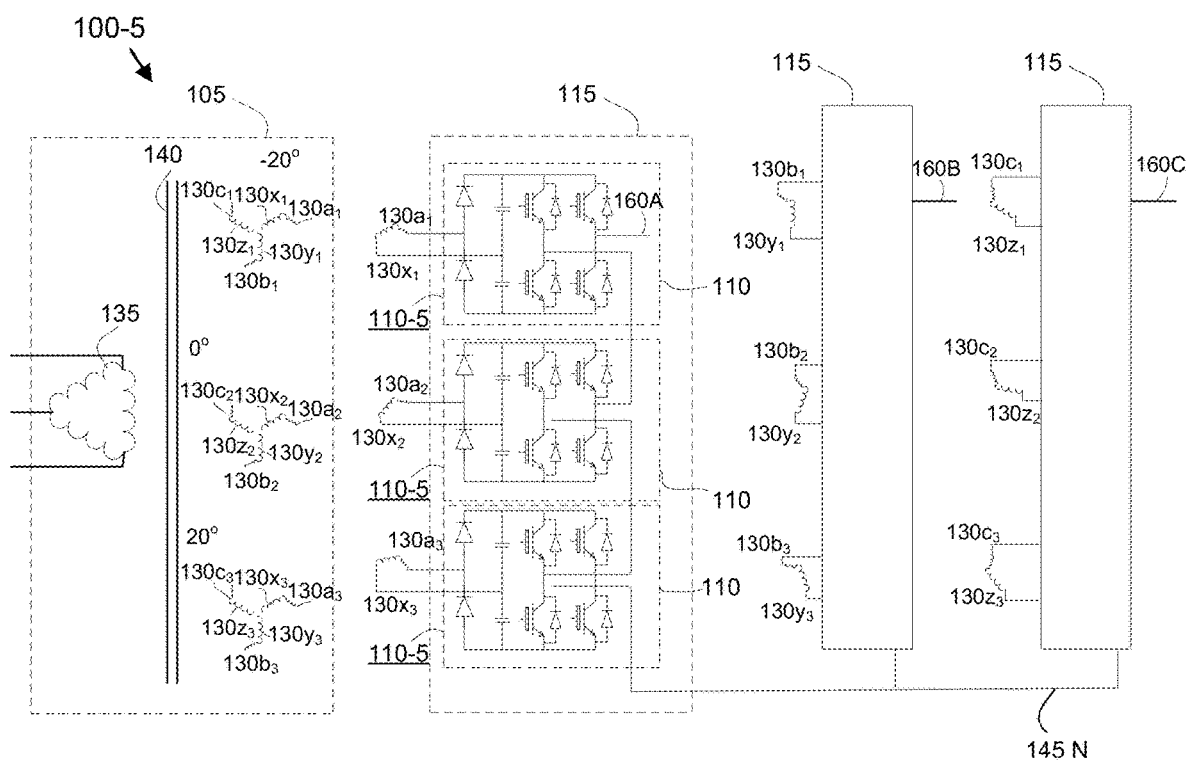
FIG. 6B is a schematic diagram of a power supply with power cells with a two-device rectifier and a four-device inverter according to an embodiment.

FIG. 6B is a schematic diagram of a power supply 100b of FIG. 1B with power cells 110-5 with a two-semiconductor power device rectifier 150 and a four-semiconductor power device inverter 155. The rectifier 150 of each power cell 110-5 comprises two diodes 125a. The inverter 155 of each power cell 110-5 comprises four IGBTs 125b. For clarity, one power cell set 115 is fully displayed and the two other power cell sets 115 are schematically displayed.

Figure 7A:
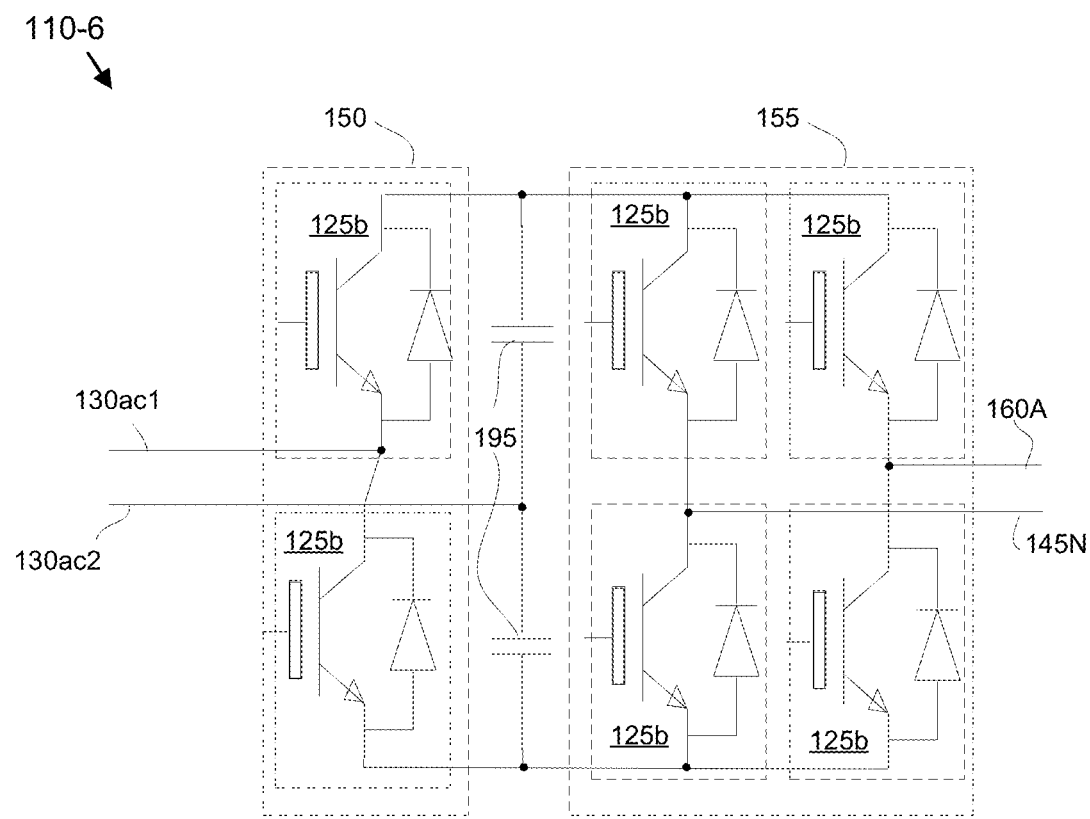
FIG. 7A is a schematic diagram of a power cell with a two-device rectifier and a four-device inverter according to an alternate embodiment.

FIG. 7A is a schematic diagram of a power cell 110-6 with a two-semiconductor power device rectifier 150 and a four-semiconductor power device inverter 155. In the depicted embodiment, the power cell 110-6 comprises a rectifier 150 and an inverter 155. The rectifier 150 comprises two IGBTs 125b. The rectifier 150 is connected to one secondary winding set 130ac1-2. The inverter 155 comprises four IGBTs 125b that output a phase 160A-C of the three-phase AC output and a neutral 145N. Two non-power semiconductor device capacitors 195 are also shown.

Figure 7B:
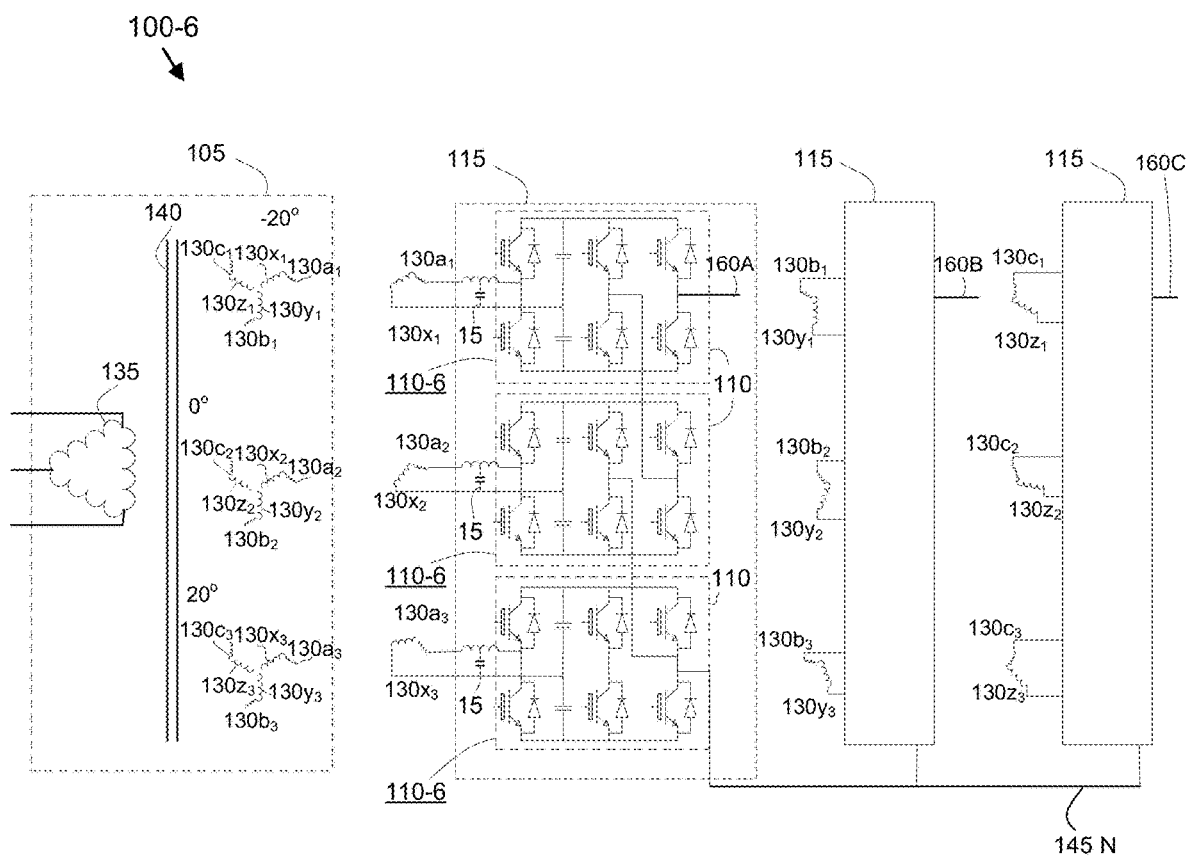
FIG. 7B is a schematic diagram of a power supply with power cells with a two-device rectifier and a four-device inverter according to an alternate embodiment.

FIG. 7B is a schematic diagram of a power supply 100b of FIG. 1B with power cells 110-6 of FIG. 7A with a two-semiconductor power device rectifier 150 and a four-semiconductor power device inverter 155. In the depicted embodiment, the rectifier 150 of each power cell 110-6 comprises two IGBTs 125b. The inverter 155 of each power cell 110-6 comprises four IGBTs 125b. In addition, each power cell 110-6 comprises an LCL filter 15. For clarity, one power cell set 115 is fully displayed and the two other power cell sets 115 are schematically displayed.

Figure 8A:
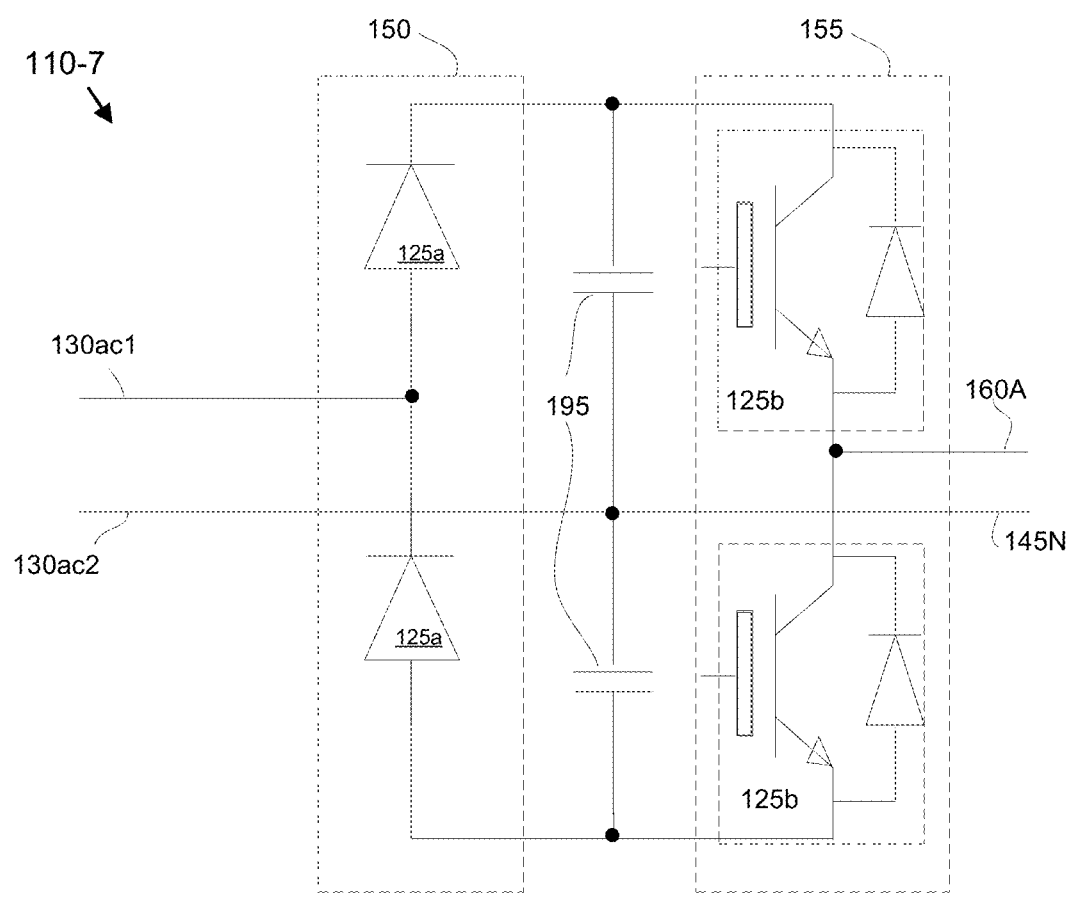
FIG. 8A is a schematic diagram of a power cell with a two-device rectifier and a two-device inverter according to an embodiment.

FIG. 8A is a schematic diagram of a power cell 110-7 with a two-semiconductor power device rectifier 150 and a two-semiconductor power device inverter 155. In the depicted embodiment, the power cell 110-7 comprises a rectifier 150 and an inverter 155. The rectifier 150 comprises two diodes 125a. The rectifier 150 is connected to one secondary winding set 130ac1-2. The inverter 155 comprises two IGBTs 125b that output a phase 160A-C of the three-phase AC output and a neutral 145N. Two non-power semiconductor device capacitors 195 are also shown.

Figure 8B:
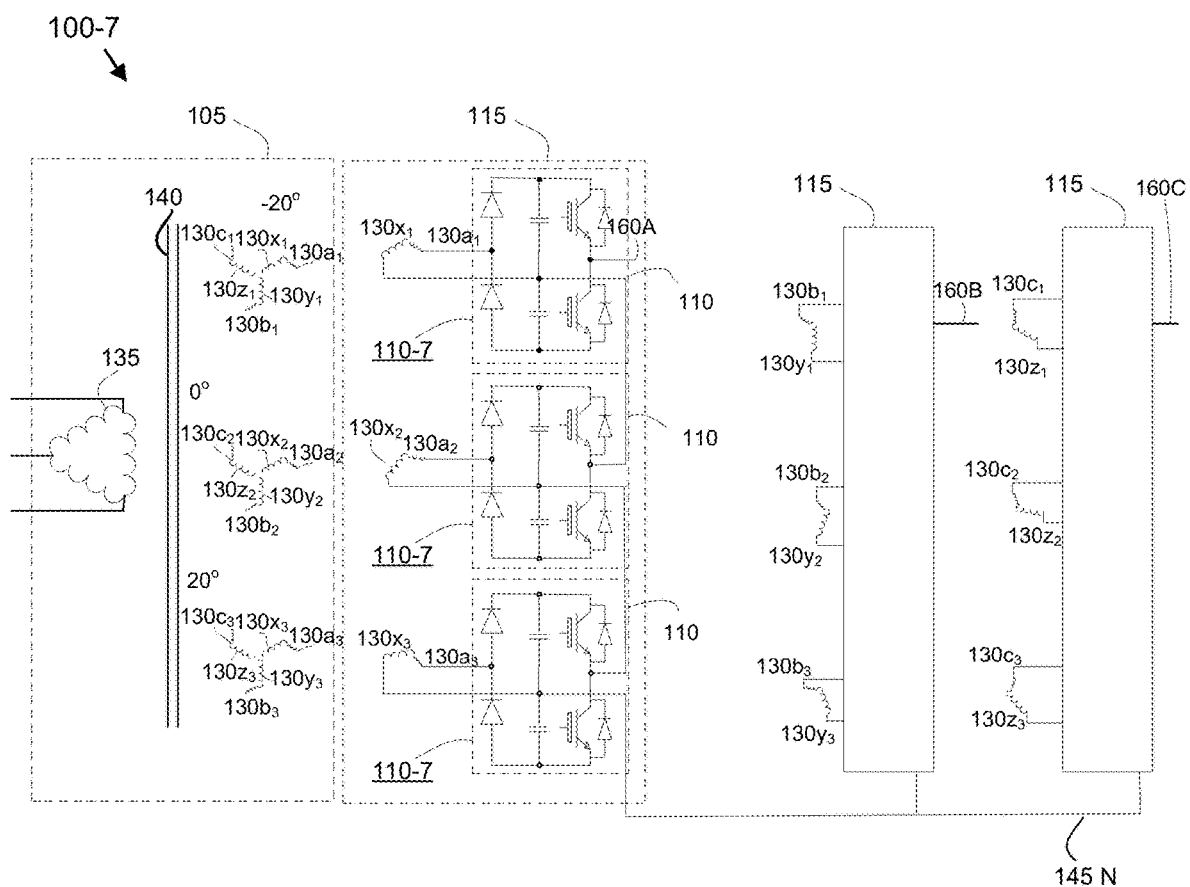
FIG. 8B is a schematic diagram of a power supply with power cells with a two-device rectifier and a two-device inverter according to an embodiment.

FIG. 8B is a schematic diagram of a power supply 100b of FIG. 1B with power cells 110-7 of FIG. 8A with a two-semiconductor power device rectifier 150 and a two-semiconductor power device inverter 155. In the depicted embodiment, the rectifier 150 of each power cell 110-7 comprises two diodes 125a. The inverter 155 of each power cell 110-7 comprises two IGBTs 125b. For clarity, one power cell set 115 is fully displayed and the two other power cell sets 115 are schematically displayed.

Figure 9A:
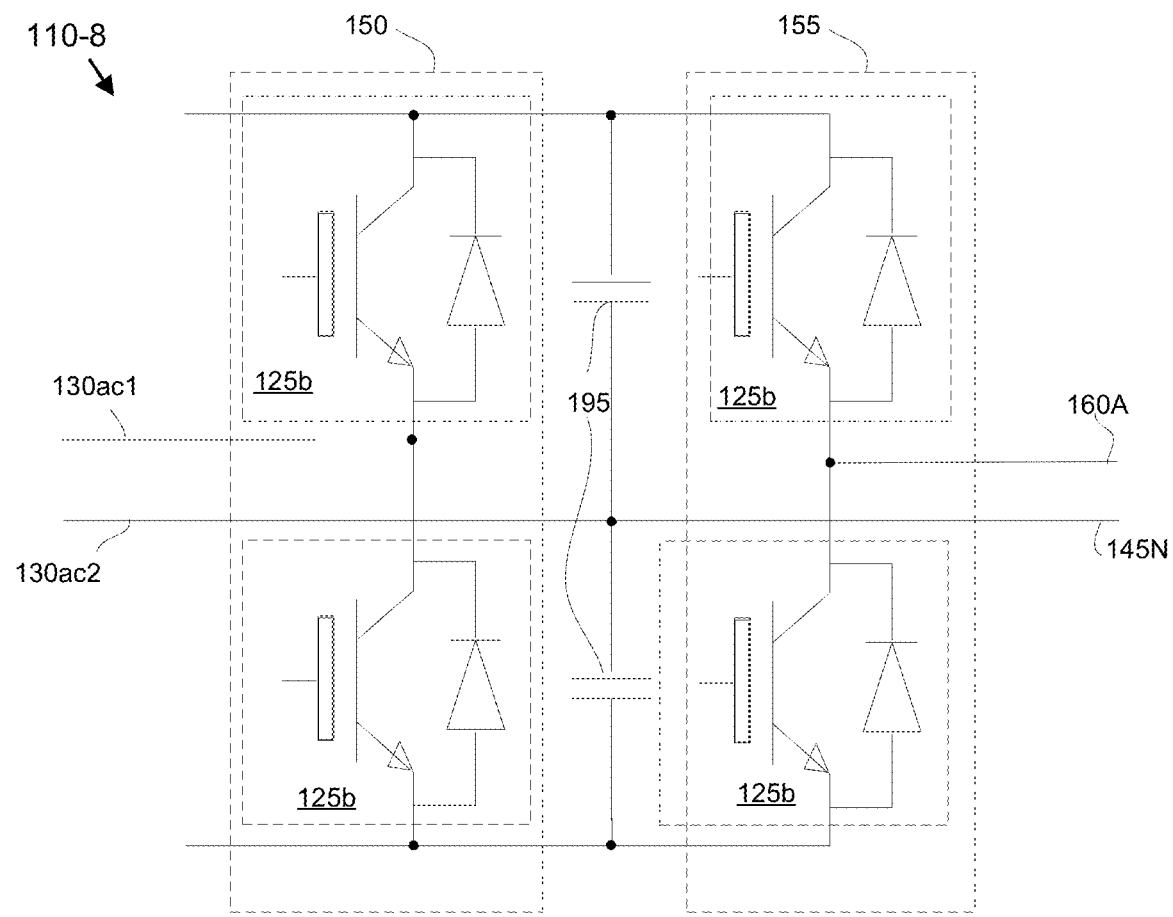
FIG. 9A is a schematic diagram of a power cell with a two-device rectifier and a two-device inverter according to an alternate embodiment.

FIG. 9A is a schematic diagram of a power cell 110-8 with a two-semiconductor power device rectifier 150 and a two-semiconductor power device inverter 155. In the depicted embodiment, the power cell 110-8 comprises a rectifier 150 and an inverter 155. The rectifier 150 comprises two IGBTs 125b. The rectifier 150 is connected to one secondary winding set 130ac1-2. The inverter 155 comprises two IGBTs 125b that output a phase 160A-C of the three-phase AC output and a neutral 145N. Two non-power semiconductor device capacitors 195 are also shown.

Figure 9B:
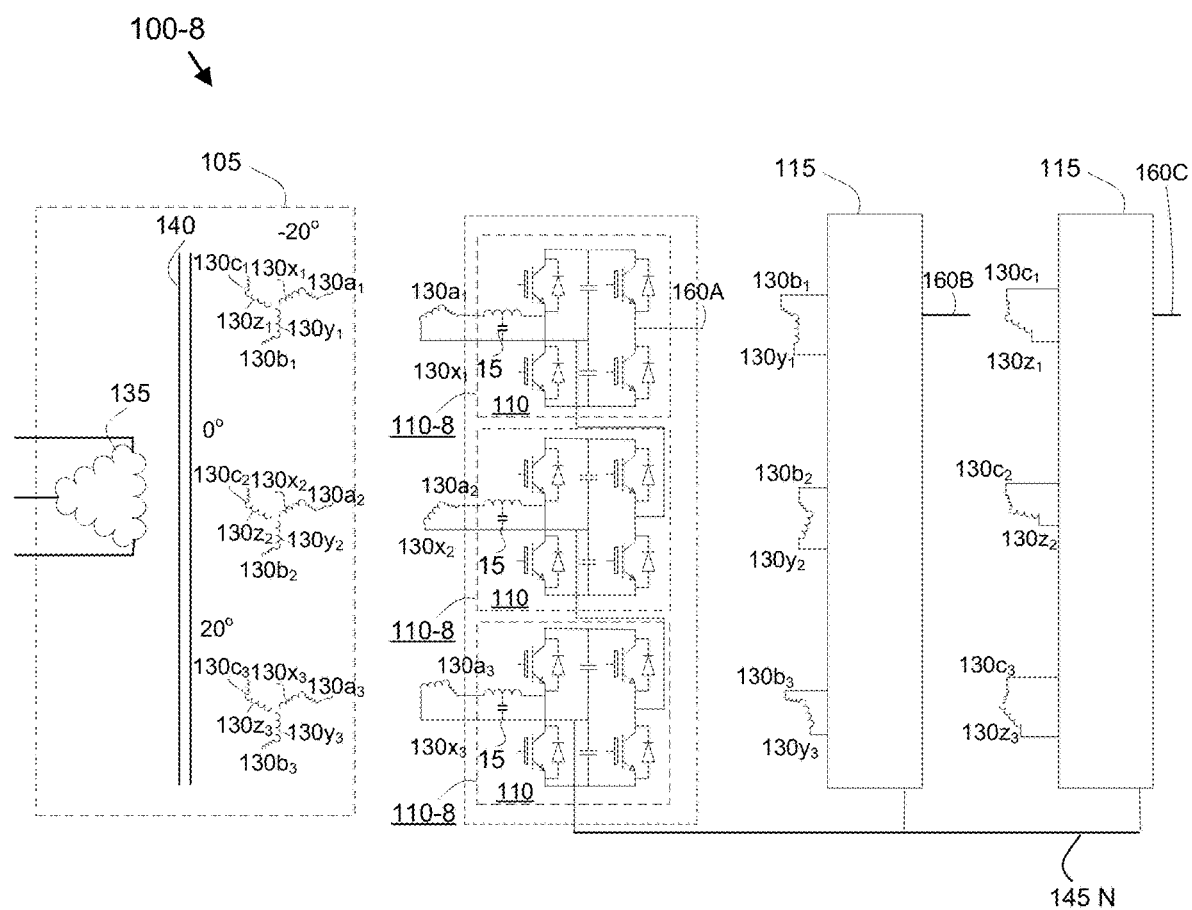
FIG. 9B is a schematic diagram of a power supply with power cells with a two-device rectifier and a two-device inverter according to an alternate embodiment.

FIG. 9B is a schematic diagram of a power supply 100b of FIG. 1B with power cells 110-8 of FIG. 9A with a two-semiconductor power device rectifier 150 and a two-semiconductor power device inverter 155. In the depicted embodiment, the rectifier 150 of each power cell 110-8 comprises two IGBTs 125b, and the inverter 155 of each power cell 110 comprises two IGBTs 125b. In addition, each power cell 110-8 comprises an LCL filter 15. For clarity, one power cell set 115 is fully displayed and the two other power cell sets 115 are schematically displayed.

Figure 10:
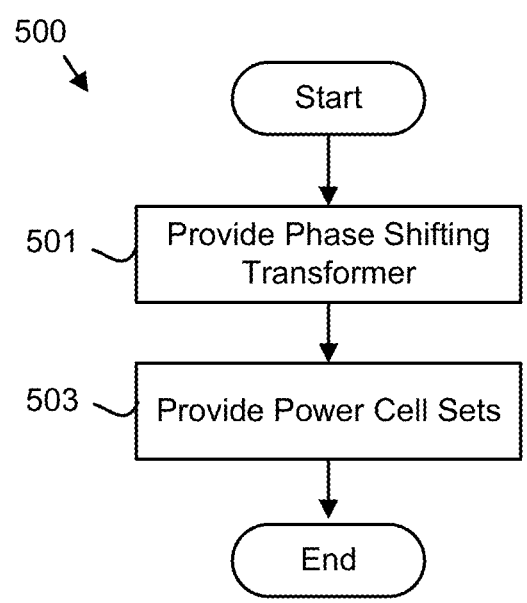
FIG. 10 is a flow chart diagram of a power supply method according to an embodiment.

FIG. 10 is a flow chart diagram of a power supply method 500. The method 500 may be performed by the power supply 100. The method 500 may provide 501 a phase shifting transformer 105 that receives the three-phase primary voltage and steps the three-phase primary voltage down to the secondary voltage with a plurality of secondary winding sets 130a-c. In one embodiment, there is phase shifting between different secondary winding sets 130.

The method may further provide 503 a plurality of power cell sets 115 that each comprise a plurality of power cells 110 cascaded connected. Each power cell 110 may receive one of a single phase and a three-phase voltage of a distinct secondary winding set 130 of the phase shifting transformer 105. Each power cell 110 may comprise no more than eight power semiconductor devices 125 organized as a rectifier 150 and an inverter 155. Each power semiconductor device 125 may be one of a diode 125a and an IGBT 125b. Each IGBT may comprise an anti-parallel diode 143. Each power cell set 115 may generate one phase of a three-phase AC output.

Figure 11:
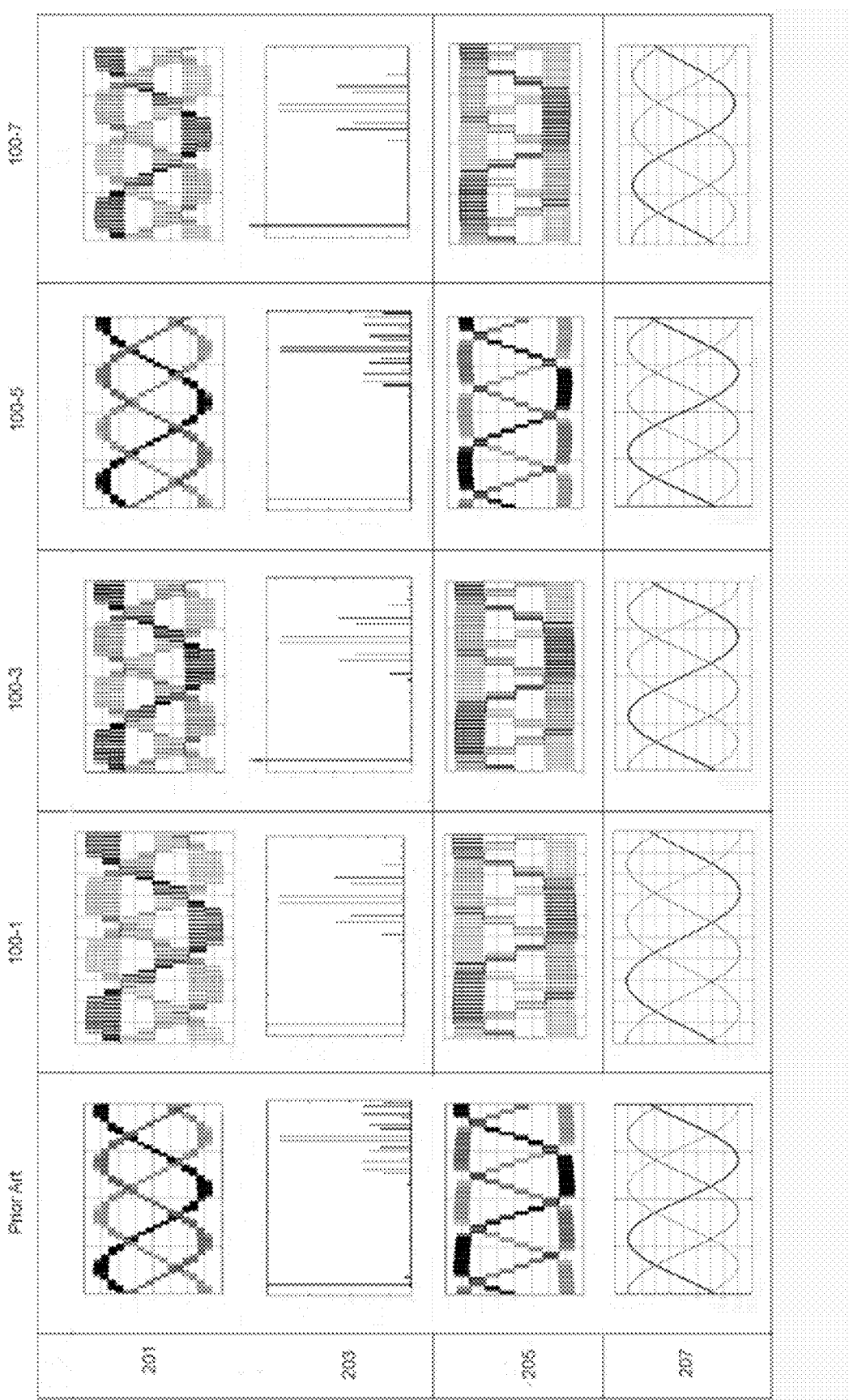
FIG. 11 is graphs of power supply outputs according to an embodiment.

FIG. 11 is graphs of power supply outputs that compares the line-to-line output voltage 201, the line-to-line harmonics 203, the line-to-neutral output voltage 205, and the line-to-neutral current 207 for the output of a prior art power cell, the power cell 110-1 of FIG. 2A, the power cell 110-3 of FIG. 4A, the power cell 110-5 of FIG. 6A, and the power cell 110-7 of FIG. 8A.

Figure 12A:
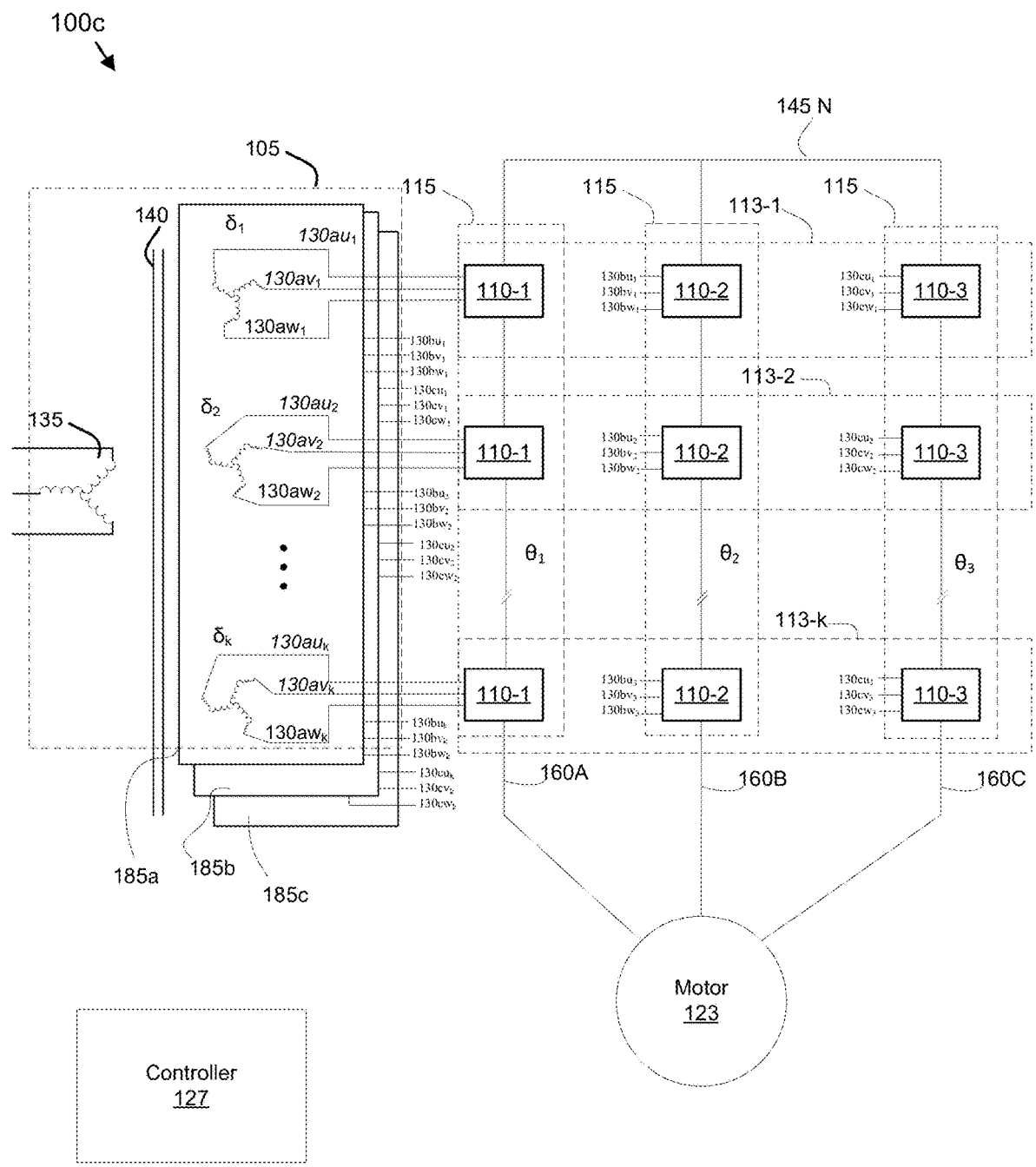
FIG. 12A is a schematic diagram of a power supply according to an embodiment.

FIG. 12A is a schematic diagram of a power supply 100c. The power supply 100c may be a cascade H bridge power supply 100 that supports regeneration. The power supply 100c supplies a three-phase AC output 160 with variable voltage and frequency to a load such as the motor 123. The power supply 100c includes a phase shifting transformer 105 and a plurality of power cell sets 115.

In the depicted embodiment, the phase shifting transformer 105 includes primary winding 135, a core 140, and a plurality of 3k secondary winding sets 130, where k is an integer. The primary winding 135 of the phase shifting transformer 105 receives the three-phase primary voltage. The plurality of secondary winding sets 130 are magnetically coupled with the primary winding 135 and step the three-phase primary voltage up or down to a secondary voltage with the plurality of first phase voltages, the plurality of second phase voltages, and the plurality of third phase voltages. The first, second, and third phase voltages are shown hereafter in FIGS. 13B-D.

In the depicted embodiment, the transformer 105 employs a Wye (Y) connected primary winding 135 and zigzag connected secondary winding sets 130. The transformer 105 may also employ a Delta (Δ) connected primary winding 135, an extended-Delta (Δ) secondary winding set 130, and/or polygon connected secondary winding sets 130.

The plurality of three power cell sets 115 each comprise a plurality of power cells 110 cascaded connected. Each power cell set 115 comprises k power cells 110. Each power cell set 115 generates one phase of a three-phase AC output 160A-C. In the depicted embodiment, the phase shifting transformer 105 comprises 3k secondary winding sets 130 and three power cell rows 113-1-k. In one embodiment, the secondary phase shift δ is $$\delta = \frac{60}{k}$$

degrees between the secondary winding sets 130 for each power cell set 115. For example, for k=5, $\delta_1$=+24 degrees, $\delta_2$=+12 degrees, $\delta_3$=0 degrees, $\delta_4$=−12 degrees, $\delta_5$=−24 degrees.

The power cells 110 may be controlled by the controller 127 with sinusoidal pulse width modulation control signals. In one embodiment, the power cells 110 are controlled with modulation control signals selected from the group consisting of sinusoidal pulse width modulation control signals, modified pulse width modulation control signals, random pulse width modulation control signals, third harmonic injection pulse width modulation control signals, and space vector modulation control signals. The carrier angle phase shifts θ may be the same for the rectifier 150 in all power cells 110, $\theta_1=\theta_2=\theta_3$ and the switching frequency for the modulation control signals is 4020 Hz. Alternatively, the carrier phase shifting angles of the rectifiers 150 in the power cell sets 115 may be shifted by 120 degrees from each other. For example, the carrier angles may be $\theta_1$, $\theta_2=\theta_1\pm120°$, and $\theta_3=\theta_1\pm240°$. In a certain embodiment, the switching frequency for the modulation control signals is 1980 Hz.

Figure 12B:
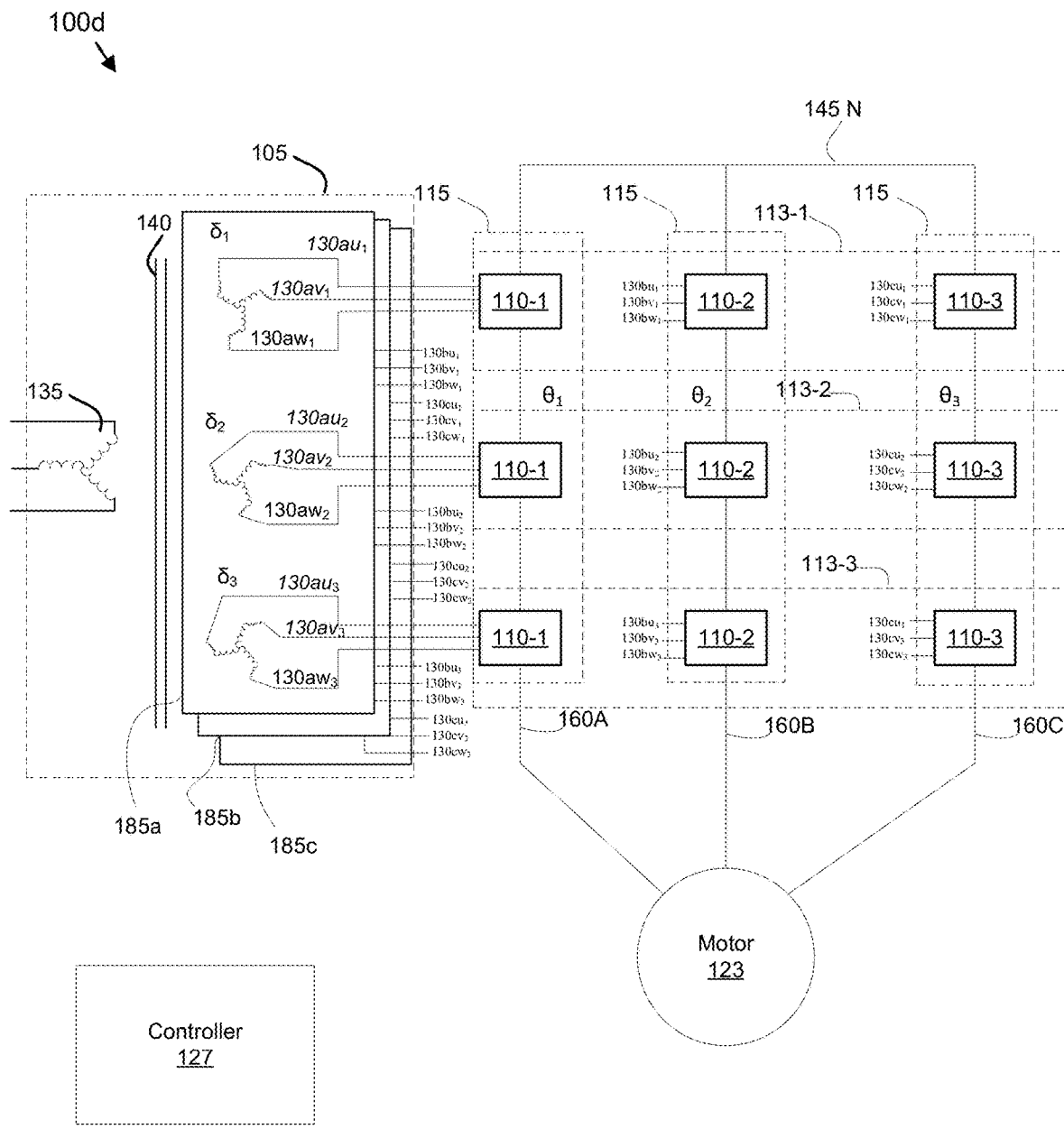
FIG. 12B is a schematic diagram of an alternate power supply according to an embodiment.

FIG. 12B is a schematic diagram of a power supply 100d. The power supply 100d may be a cascade H bridge power supply 100 that supports regeneration. The power supply 100d supplies a three-phase AC output 160 with variable voltage and frequency to a load. In the depicted embodiment, the load is a motor 123. The AC output 160 may drive one or more motors 123 as the load. The power supply 100d includes a phase shifting transformer 105 and a plurality of power cell sets 115.

In the depicted embodiment, the phase shifting transformer 105 includes primary winding 135, a core 140, and a plurality of secondary winding sets 130. The primary winding 135 of the phase shifting transformer 105 receives the three-phase primary voltage. The plurality of secondary winding sets 130 are magnetically coupled with the primary winding 135 and step the three-phase primary voltage up or down to a secondary voltage with a plurality of first phase voltages, a plurality of second phase voltages, and a plurality of third phase voltages.

In the depicted embodiment, the transformer 105 employs a Wye (Y) connected primary winding 135 and zigzag connected secondary winding sets 130. The transformer 105 may also employ a Delta (Δ) connected primary winding 135, an extended-Delta (Δ) secondary winding set 130, and/or polygon connected secondary winding sets 130.

The plurality of power cell sets 115 each comprise a plurality of power cells 110 cascaded connected. Each power cell set 115 generates one phase of a three-phase AC output 160A-C. In the depicted embodiment, the phase shifting transformer 105 comprises 9 secondary winding sets 130 and three power cell rows 113-1-3. In one embodiment, there is secondary phase shifting between the different secondary winding sets 130. The secondary phase δ shifting may be 20 degrees. For example, $\delta_1$=+20 degrees, $\delta_2$=0 degrees, $\delta_3$=−20 degrees.

The power cells 110 may be controlled by a controller 127 with sinusoidal pulse width modulation control signals. In one embodiment, the power cells 110 are controlled with modulation control signals selected from the group consisting of sinusoidal pulse width modulation control signals, modified pulse width modulation control signals, random pulse width modulation control signals, third harmonic injection pulse width modulation control signals, and space vector modulation control signals. The carrier angle phase shifts θ may be the same for the rectifier 150 in all power cells 110, $\theta_1=\theta_2=\theta_3$ and the switching frequency for the modulation control signals is 4020 Hz. Alternatively, the carrier angles $\theta_1$, $\theta_2$, and $\theta_3$ for rectifier 150 in the power cells 110-1, 110-2, and 110-3 may be phase shifted by 120 degrees. For example, the carrier angles may be $\theta_1$, $\theta_2=\theta_1+120$ degrees, and $\theta_3=\theta_1+240$ degrees. In a certain embodiment, the switching frequency for the modulation control signals is 1980 Hz.

Figure 12C:
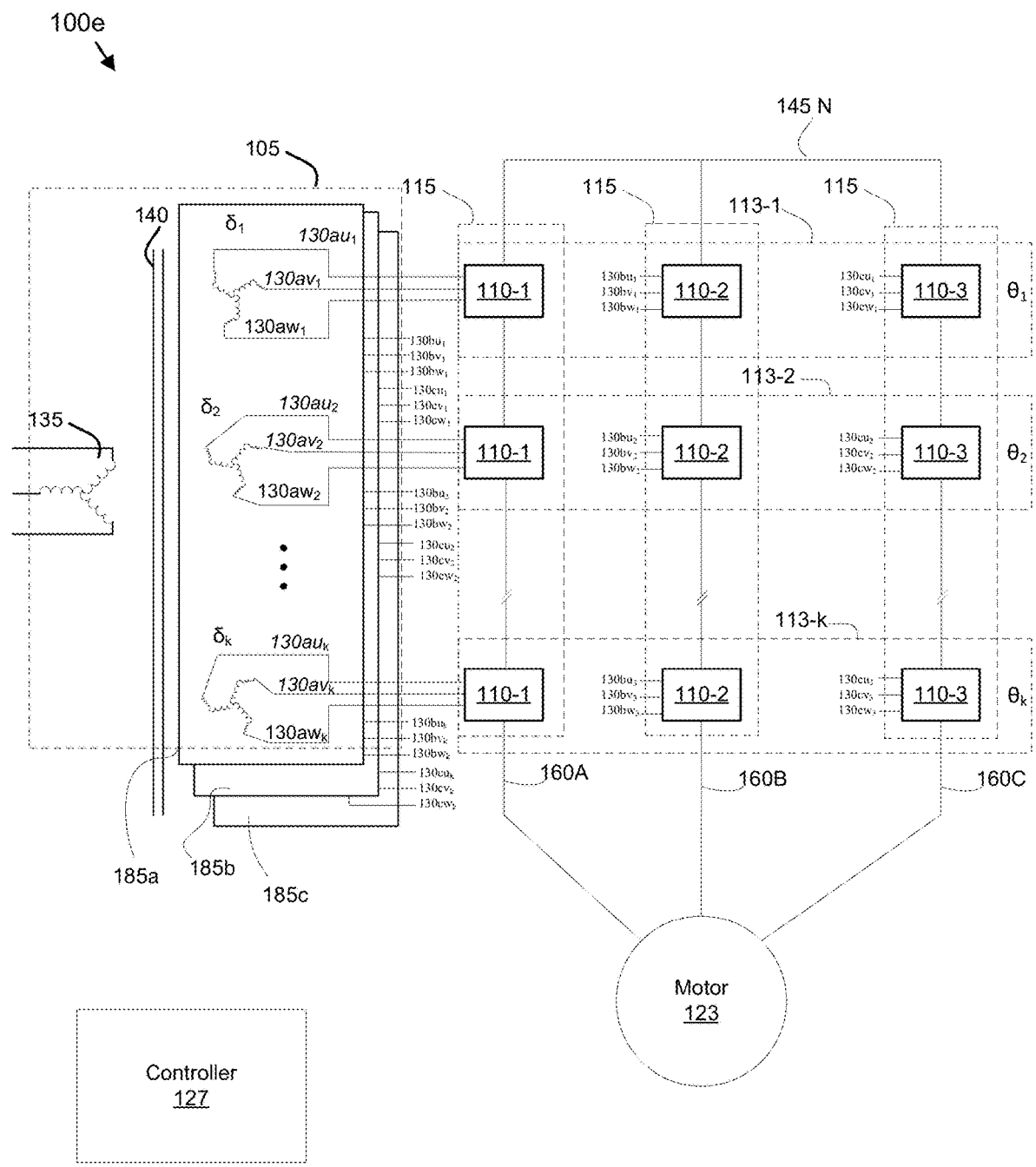
FIG. 12C is a schematic diagram of an alternate power supply according to an embodiment.

FIG. 12C is a schematic diagram of a power supply 100e. The power supply 100e may be a cascade H bridge power supply 100 that supports regeneration. The power supply 100e supplies a three-phase AC output 160 with variable voltage and frequency to a load such as the motor 123. The power supply 100e includes a phase shifting transformer 105 and a plurality of power cell sets 115.

In the depicted embodiment, the phase shifting transformer 105 includes primary winding 135, a core 140, and a plurality of 3k secondary winding sets 130, where k is an integer. The primary winding 135 of the phase shifting transformer 105 receives the three-phase primary voltage. The plurality of secondary winding sets 130 are magnetically coupled with the primary winding 135 and step the three-phase primary voltage up or down to a secondary voltage with the plurality of first phase voltages, the plurality of second phase voltages, and the plurality of third phase voltages.

In the depicted embodiment, the transformer 105 employs a Wye (Y) connected primary winding 135 and zigzag connected secondary winding sets 130. The transformer 105 may also employ a Delta (Δ) connected primary winding 135 and/or and extended-Delta (Δ) secondary winding set 130, and/or polygon connected secondary winding sets 130.

The plurality of three power cell sets 115 each comprise a plurality of power cells 110 cascaded connected. Each power cell set 115 comprises k power cells 110. Each power cell set 115 generates one phase of a three-phase AC output 160A-C. In the depicted embodiment, the phase shifting transformer 105 comprises 3k secondary winding sets 130 and k power cell rows 113-1-k. In one embodiment, there is no secondary phase shifting δ between the secondary winding sets 130, and $\delta_1=\delta_2=\ldots=\delta_k$.

The power cells 110 may be controlled by the controller 127 with sinusoidal pulse width modulation control signals. In one embodiment, the power cells 110 are controlled with modulation control signals selected from the group consisting of sinusoidal pulse width modulation control signals, modified pulse width modulation control signals, random pulse width modulation control signals, third harmonic injection pulse width modulation control signals, and space vector modulation control signals. The carrier angles θ for the rectifiers 150 in each power cell row 113-n may be the same. For example, the carrier angles a first row 113-1 may be $\theta_1$ degrees. The carrier phase shifting angles $\theta_1$, $\theta_2, \ldots, \theta_k$ of rectifiers 150 in different power cell rows 113 may be shifted by $$\frac{360}{k}$$

degrees from each other. For example, for k=5, the carrier phase shifting angles are $\theta_1$, $\theta_2=\theta_1+62$ degrees, $\theta_3=\theta_1+124$ degrees, $\theta_4=\theta_1-62$ degrees, $\theta_5=\theta_1-124$ degrees. For k=3, the carrier angles are $\theta_1$ for the first power cell row 113-1, $\theta_2=\theta_1\pm120°$ for the second power cell row 113-2, and $\theta_3=\theta_1\pm240°$ for the third power cell row 113-3. In a certain embodiment, the switching frequency for the modulation control signals is 1980 Hz.

Figure 12D:
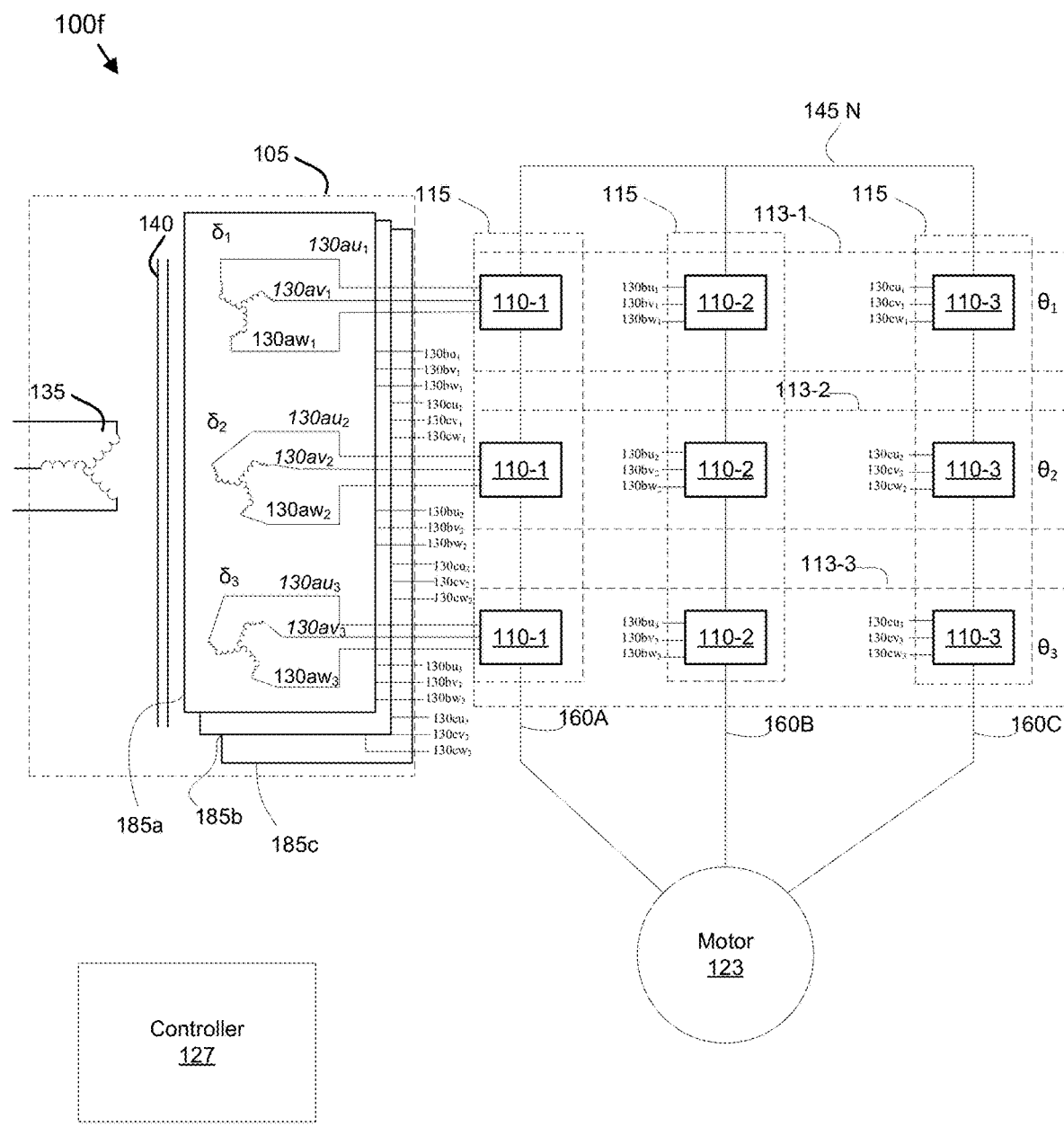
FIG. 12D is a schematic diagram of an alternate power supply according to an embodiment.

FIG. 12D is a schematic diagram of a power supply 100f. The power supply 100f may be a cascade H bridge power supply 100 that supports regeneration. The power supply 100f supplies a three-phase AC output 160 with variable voltage and frequency to a load such as the motor 123. The power supply 100f includes a phase shifting transformer 105 and a plurality of power cell sets 115.

In the depicted embodiment, the phase shifting transformer 105 includes primary winding 135, a core 140, and a plurality of secondary winding sets 130. The primary winding 135 of the phase shifting transformer 105 receives the three-phase primary voltage. The plurality of secondary winding sets 130 are magnetically coupled with the primary winding 135 and step the three-phase primary voltage up or down to a secondary voltage with the plurality of first phase voltages, the plurality of second phase voltages, and the plurality of third phase voltages.

In the depicted embodiment, the transformer 105 employs a Wye (Y) connected primary winding 135 and zigzag connected secondary winding sets 130. The transformer 105 may also employ a Delta (Δ) connected primary winding 135, an extended-Delta (Δ) secondary winding set 130, and/or polygon connected secondary winding sets 130.

The plurality of power cell sets 115 each comprise a plurality of power cells 110 cascaded connected. Each power cell set 115 generates one phase of a three-phase AC output 160A-C. In the depicted embodiment, the phase shifting transformer 105 comprises 9 secondary winding sets 130 and three power cell rows 113-1-3. In one embodiment, there is no secondary phase shifting δ between the top, middle, and bottom secondary winding sets 130, and $\delta_1=\delta_2=\delta_3$.

The power cells 110 may be controlled by the controller 127 with sinusoidal pulse width modulation control signals. In one embodiment, the power cells 110 are controlled with modulation control signals selected from the group consisting of sinusoidal pulse width modulation control signals, modified pulse width modulation control signals, random pulse width modulation control signals, third harmonic injection pulse width modulation control signals, and space vector modulation control signals. The carrier angles for the rectifiers 150 in power cell rows 113 may be $\theta_1$ for the first power cell row 113-1, $\theta_2=\theta_1\pm120°$ for the second power cell row 113-2, and $\theta_3=\theta_1\pm240°$ for the third power cell row 113-3 and the switching frequency for the modulation control signals is 1980 Hz.

Figure 13A:
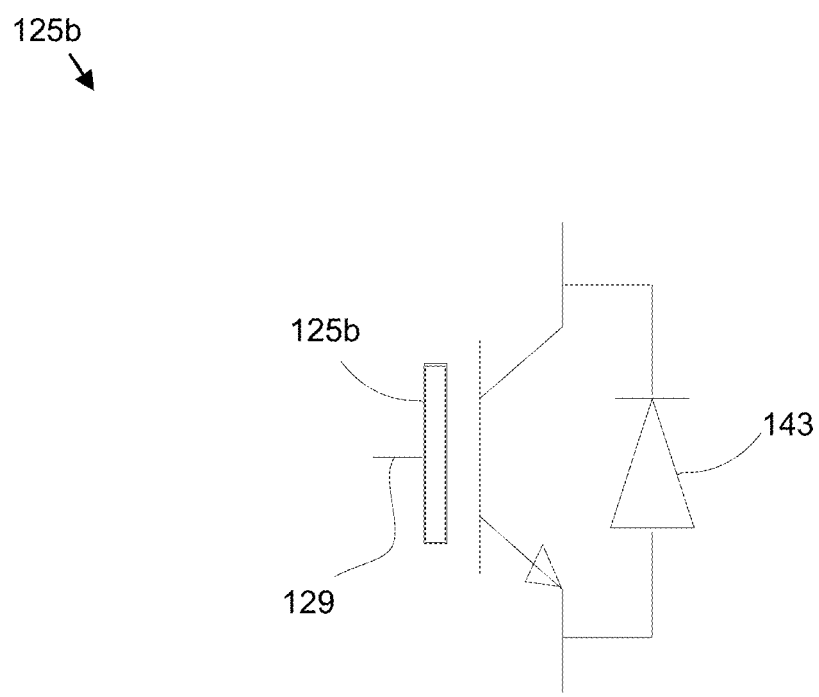
FIG. 13A is a schematic diagram of an active switch according to an embodiment.

FIG. 13A is a schematic diagram of an active switch 125b. In the depicted embodiment, the active switch 125b includes an anti-parallel diode 143. The active switch 125b is controlled by a modulation control signal 129 from the controller 127.

Figure 13B:
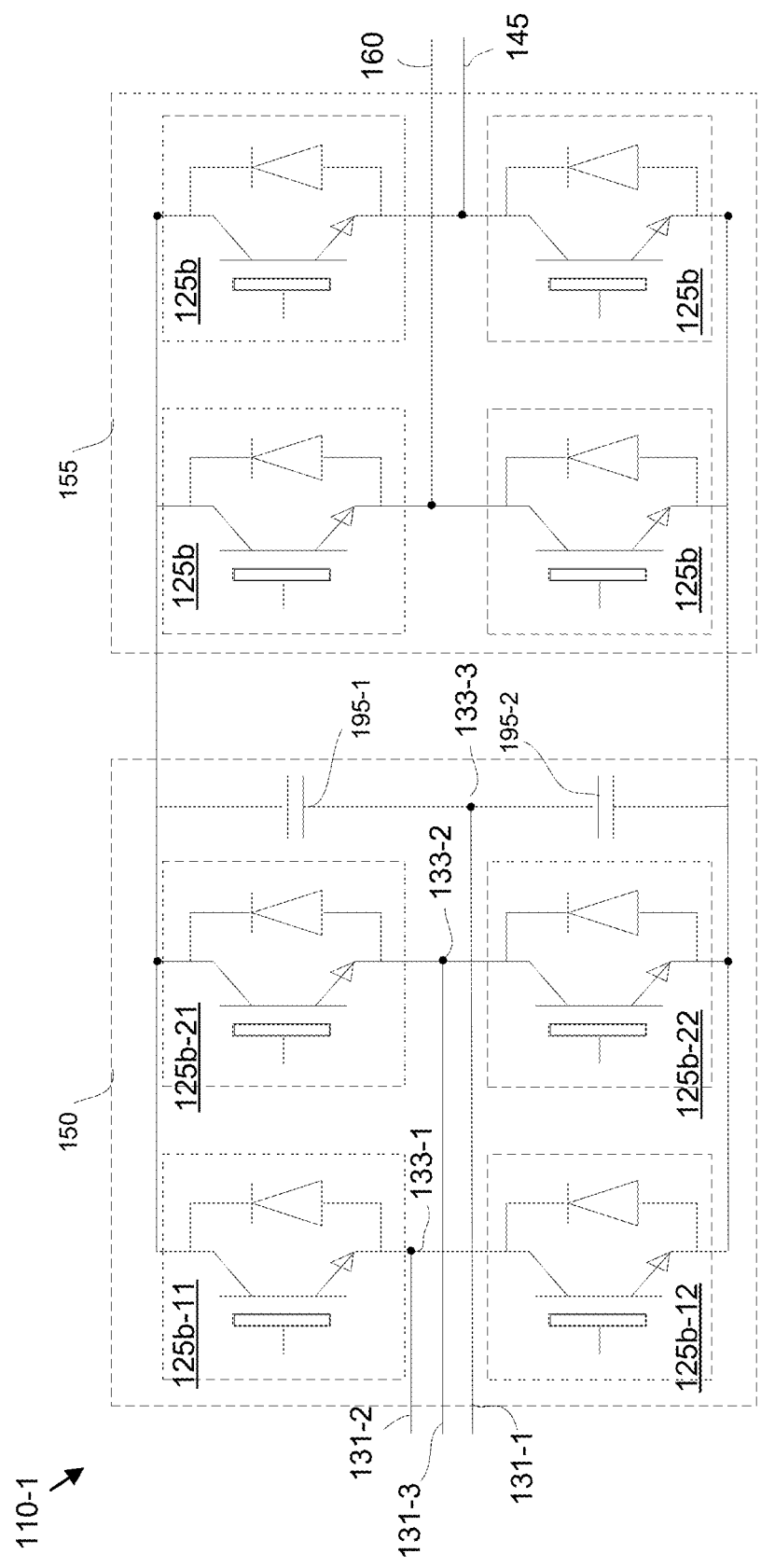
FIGS. 13B-D are schematic diagram of a power cell according to an embodiment.
Figure 13C:
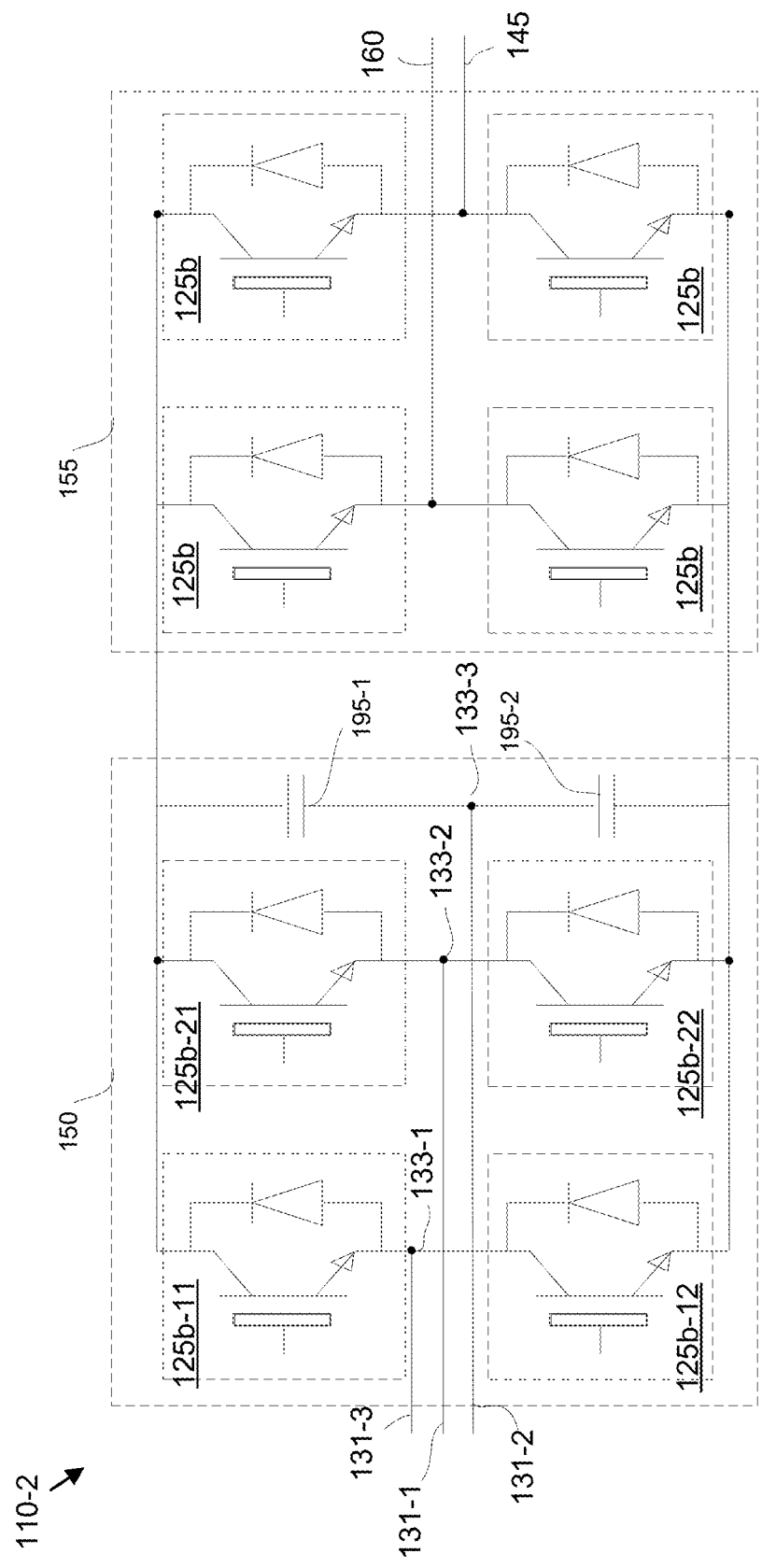
Figure 13D:
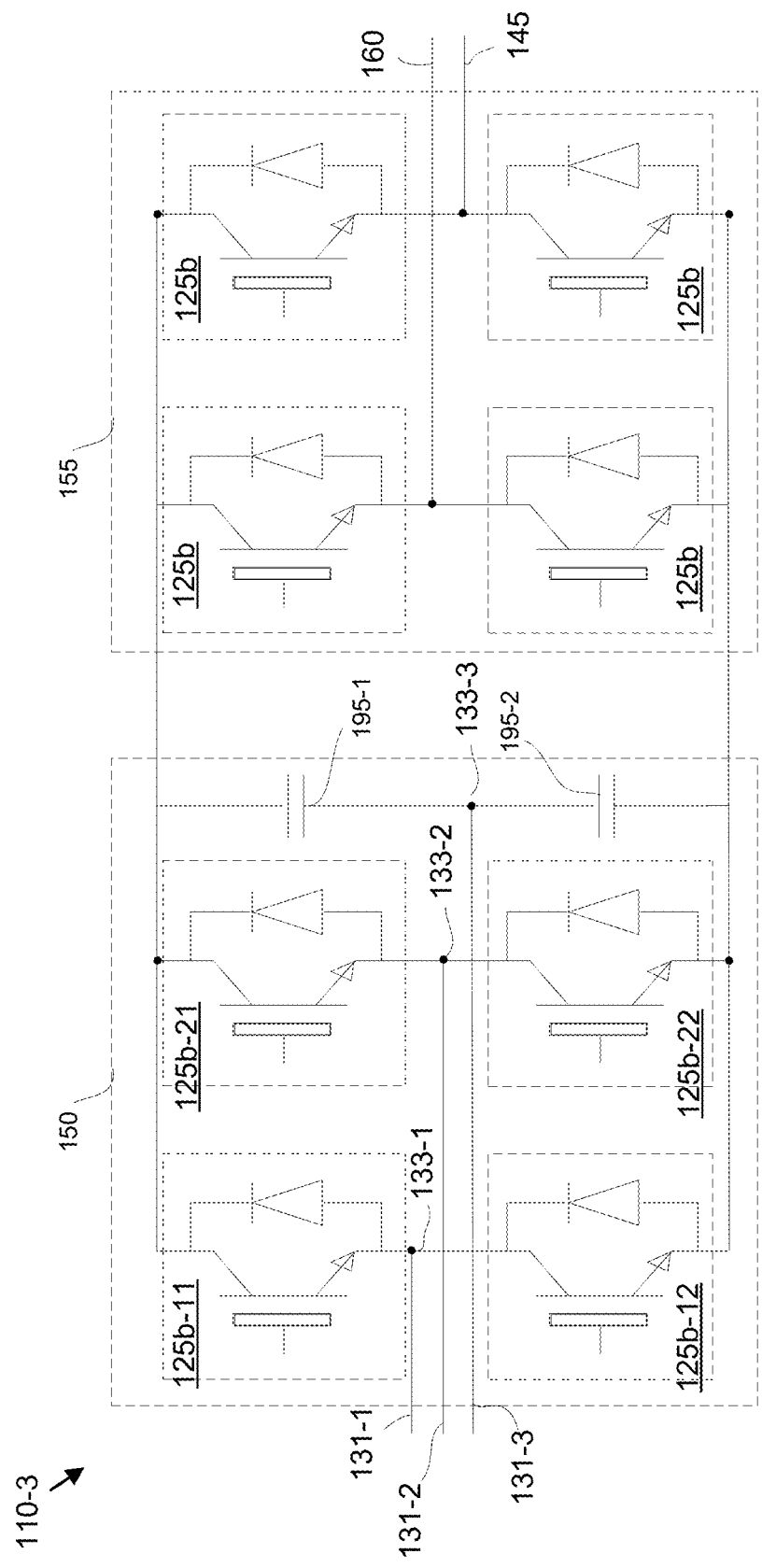

FIGS. 13B-D are schematic diagram of a power cell 110. Each power cell 110 comprises a rectifier 150 and an inverter 155. In the depicted embodiment, the inverter 155 is an H-bridge of four active switches 125b. The inverter 155 outputs a phase of the AC output 160 and connects to the neutral 145.

The rectifier 150 comprising two first active switches 125b-1 that are serially connected and receive a phase voltage 131 at a first switch midpoint 133-1, two second active switches 125b-2 that are serially connected and receive another phase voltage 131 at a second switch midpoint 133-2, and two capacitors 195 that are serially connected and receive another phase voltage 131 at a capacitor midpoint 133-3 between the capacitors 195, wherein the two first active switches 125b-1, the second two first active switches 125b-2, and the two capacitors 195 of each power cell 110 are connected in parallel. The distribution of phase voltages 131 at the first switch midpoint 133-1, the second switch midpoint 133-2, and the capacitor midpoint 133-3 reduces harmonics of a primary current harmonic spectrum as is shown hereafter.

In FIG. 13B, a first power cell 110-1 is shown. A second phase voltage 131-2 is connected to the first switch midpoint 133-1, a third phase voltage 131-3 is connected to the second switch midpoint 133-2, and a first phase voltage 131-1 is connected to the capacitor midpoint 133-3. In FIG. 13C, the third phase voltage 131-3 is connected to the first switch midpoint 133-1, the first phase voltage 131-1 is connected to the second switch midpoint 133-2, and the second phase voltage 131-2 is connected to the capacitor midpoint 133-3 for a second power cell 110-2. In FIG. 13D, the first phase voltage 131-1 is connected to the first switch midpoint 133-1, the second phase voltage 131-2 is connected to the second switch midpoint 133-2, and the third phase voltage 131-3 is connected to the capacitor midpoint 133-3 for a third power cell 110-3. In one embodiment, the connections are employed for the power supplies 100e/100f of FIGS. 12C-D and for some embodiments for the power supplies 100c/100d of FIGS. 12 A-B.

The power cells 110 in the power supplies 100c/100d of FIGS. 12 A and 12B may be connected to the secondary winding sets as follows: For the first power cells 110-1, the first switch midpoint 133-1 receives the second phase voltage 131-2 from an av secondary winding set 130-av, the second switch midpoint 133-2 receives the third phase voltage 131-3 from an aw secondary winding set 130-aw, and the capacitor midpoint 133-3 receives the first phase voltage 131-1 from an au secondary winding set 130-au. For the second power cells 110-2, the first switch midpoint 133-1 receives the third phase voltage 131-3 from a bw secondary winding set 130-bw, the second switch midpoint 133-2 receives the first phase voltage 131-1 from a bu secondary winding set 130-bu, and the capacitor midpoint 133-3 receives the second phase voltage 131-2 from a by secondary winding set 130-bv. For the third power cells 110-3, the first switch midpoint 133-1 receives the first phase voltage 131-1 from a cu secondary winding set 130-cu, the second switch midpoint 133-2 receives the second phase voltage 131-2 from a cv secondary winding set 130-cv, and the capacitor midpoint 133-3 receives the third phase voltage 131-3 from a cw secondary winding set 130-cw. The embodiments include electrical equivalents. The power cells 110 may be connected to the secondary winding sets 130 as shown in Table 1 for FIG. 12B and FIG. 12A for k=3.

TABLE 1

| Secondary Winding Output 130 | Power Cell 110 | Phase Voltage 131 |
|---|---|---|
| 130-av | 110-1 | 133-1 |
| 130-aw | 110-1 | 133-2 |
| 130-au | 110-1 | 133-3 |
| 130-bw | 110-2 | 133-1 |
| 130-bu | 110-2 | 133-2 |
| 130-bv | 110-2 | 133-3 |
| 130-cu | 110-3 | 133-1 |
| 130-cv | 110-3 | 133-2 |
| 130-cw | 110-3 | 133-3 |

In one embodiment, for the power supplies 100c and 100d of FIGS. 12A and 12B, for all power cells 110, the first switch midpoint 133-1, the second switch midpoint 133-2, and the third switch midpoint 133-3 are connected in a same phase sequence. The embodiments include electrical equivalents.

In one embodiment, the power cells 110 in the power supplies 100c/100d of FIGS. 12A and 12B are connected to the secondary winding sets as follows: The first switch midpoint 133-1 receives the same phase voltage 131-1 from a u secondary winding set 130-un, the second switch midpoint 133-2 receives the second phase voltage 131-2 from a v secondary winding set 130-vn, and the capacitor midpoint 133-3 receives the third phase voltage 131-3 from a w secondary winding set 130-wn. The power cells 110 may be connected to the secondary winding sets 130 as shown in Table 2 for the power supply 100 of FIG. 12B and for FIG. 12A for k=3.

TABLE 2

| Secondary Winding Output 130 | Power Cell 110 | Phase Voltage 131 |
| --- | --- | --- |
| 130-au | 110-1 | 133-1 |
| 130-av | 110-1 | 133-2 |
| 130-aw | 110-1 | 133-3 |
| 130-bu | 110-2 | 133-1 |
| 130-bv | 110-2 | 133-2 |
| 130-bw | 110-2 | 133-3 |
| 130-cu | 110-3 | 133-1 |
| 130-cv | 110-3 | 133-2 |
| 130-cw | 110-3 | 133-3 |

The power cells 110 in the power supply 100 of FIG. 12A may be connected to the secondary winding sets as follows: For a power cell row 113-x, where x=3L−2 for L is integer and L=1 to the upper integer limit of $$\left(\frac{k}{3}\right),$$

the first switch midpoint 133-1 receives the second phase voltage 131-2 from an av secondary winding set 130-av, the second switch midpoint 133-2 receives the third phase voltage 131-3 from an aw secondary winding set 130-aw, and the capacitor midpoint 133-3 receives the first phase voltage 131-1 from an au secondary winding set 130-au, for a power cell row 113-y. Where y is integer equals to x+1 and ranges from 2 to k, the first switch midpoint 133-1 receives the third phase voltage 131-3 from a bw secondary winding set 130-bw, the second switch midpoint 133-2 receives the first phase voltage 131-1 from a bu secondary winding set 130-bu, and the capacitor midpoint 133-3 receives the second phase voltage 131-2 from a by secondary winding set 130-bv, and for a power cell row 113-z. Where z is integer equals to x+2 and ranges from 3 to k, the first switch midpoint 133-1 receives the first phase voltage 131-1 from a cu secondary winding set 130-cu, the second switch midpoint 133-2 receives the second phase voltage 131-2 from a cv secondary winding set 130-cv, and the capacitor midpoint 133-3 receives the third phase voltage 131-3 from a cw secondary winding set 130-cw. In one embodiment, k=5, x=1, 4, y=2, 5, and z=3. The embodiments include electrical equivalents.

In one embodiment, for a power cell row 113-1 in the power supplies 100c/100d in FIG. 12A (for k=3) and FIG. 12B, the first switch midpoint 133-1 receives the second phase voltage 131-2 from an av secondary winding set 130-av, the second switch midpoint 133-2 receives the third phase voltage 131-3 from an aw secondary winding set 130-aw, and the capacitor midpoint 133-3 receives the first phase voltage 131-1 from an au secondary winding set 130-au, for a power cell row 113-2, the first switch midpoint 133-1 receives the third phase voltage 131-3 from a bw secondary winding set 130-bw, the second switch midpoint 133-2 receives the first phase voltage 131-1 from a bu secondary winding set 130-bu, and the capacitor midpoint 133-3 receives the second phase voltage 131-2 from a by secondary winding set 130-bv, and for a power cell row 113-3, the first switch midpoint 133-1 receives the first phase voltage 131-1 from a cu secondary winding set 130-cu, the second switch midpoint 133-2 receives the second phase voltage 131-2 from a cv secondary winding set 130-cv, and the capacitor midpoint 133-3 receives the third phase voltage 131-3 from a cw secondary winding set 130-cw. The power cells 110 may be connected to the secondary winding sets 130 as shown in Table 3 for the power supply 100 of FIG. 12B and for FIG. 12A for k=3.

TABLE 3

| Secondary Winding Output 130 | Power Cell 110 | Phase Voltage 131 |
| --- | --- | --- |
| 130-av | 113-1 | 133-1 |
| 130-aw | 113-1 | 133-2 |
| 130-au | 113-1 | 133-3 |
| 130-bw | 113-2 | 133-1 |
| 130-bu | 113-2 | 133-2 |
| 130-bv | 113-2 | 133-3 |
| 130-cu | 113-3 | 133-1 |
| 130-cv | 113-3 | 133-2 |
| 130-cw | 113-3 | 133-3 |

The power cells 110 in the power supply 100e/100f of FIGS. 12C and 12D may be connected to the secondary winding sets as follows. For first power cells 110-1, the first switch midpoint 133-1 receives the second phase voltage 131-2 from an av secondary winding set 130-av, the second switch midpoint 133-2 receives the third phase voltage 131-3 from an aw secondary winding set 130-aw, and the capacitor midpoint 133-3 receives the first phase voltage 131-1 from an au secondary winding set 130-au. For second power cells 110-2, the first switch midpoint 133-1 receives the third phase voltage 131-3 from a bw secondary winding set 130-bw, the second switch midpoint 133-2 receives the first phase voltage 131-1 from a bu secondary winding set 130-bu, and the capacitor midpoint 133-3 receives the second phase voltage 131-2 from a by secondary winding set 130-bv. For third power cells 110-3, the first switch midpoint 133-1 receives the first phase voltage 131-1 from a cu secondary winding set 130-cu, the second switch midpoint 133-2 receives the second phase voltage 131-2 from a cv secondary winding set 130-cv, and the capacitor midpoint 133-3 receives the third phase voltage 131-3 from a cw secondary winding set 130-cw.

The power cells 110 may be connected to the secondary winding sets 130 as shown in Table 4 for the power supply 100e of FIG. 12C (for k=3) and the power supply 100f of FIG. 12D.

TABLE 4

| Secondary Winding Output 130 | Power Cell 110 | Phase Voltage 131 |
| --- | --- | --- |
| 130-av | 110-1 | 133-1 |
| 130-aw | 110-1 | 133-2 |
| 130-au | 110-1 | 133-3 |
| 130-bw | 110-2 | 133-1 |
| 130-bu | 110-2 | 133-2 |
| 130-bv | 110-2 | 133-3 |

TABLE 4-continued

| Secondary Winding Output 130 | Power Cell 110 | Phase Voltage 131 |
|---|---|---|
| 130-cu | 110-3 | 133-1 |
| 130-cv | 110-3 | 133-2 |
| 130-cw | 110-3 | 133-3 |

Figure 14A:
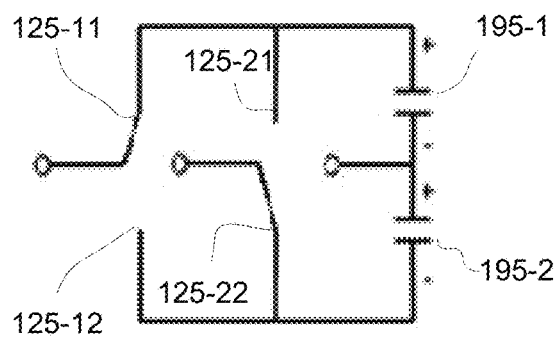
FIGS. 14A-D are schematic diagrams of power cell switching according to an embodiment.
Figure 14B:
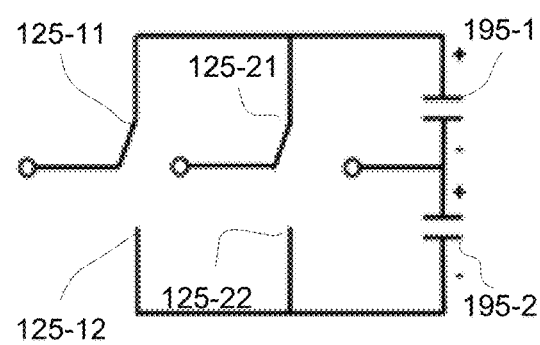
Figure 14C:
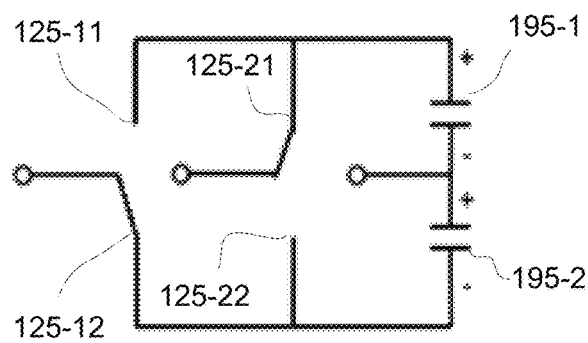
Figure 14D:
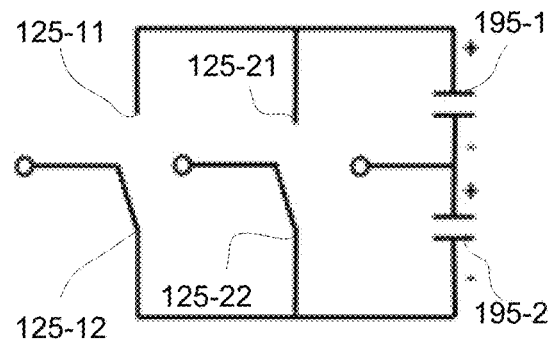

FIGS. 14A-D are schematic diagrams of power cell switching. The controller 127 controls the modulation control signals 129 so that the active switches 125 are switched. FIG. 14A shows a first position with active switch 125-11 and active switch 125-22 on and active switch 125-12 and active switch 125-21 off. FIG. 14B shows a second position with active switch 125-11 and active switch 125-21 on and active switch 125-12 and active switch 125-22 off. FIG. 14C shows a third position with active switch 125-12 and active switch 125-21 on and active switch 125-11 and active switch 125-22 off. FIG. 14D shows a fourth position with active switch 125-12 and active switch 125-22 on and active switch 125-11 and active switch 125-21 off.

Figure 15:
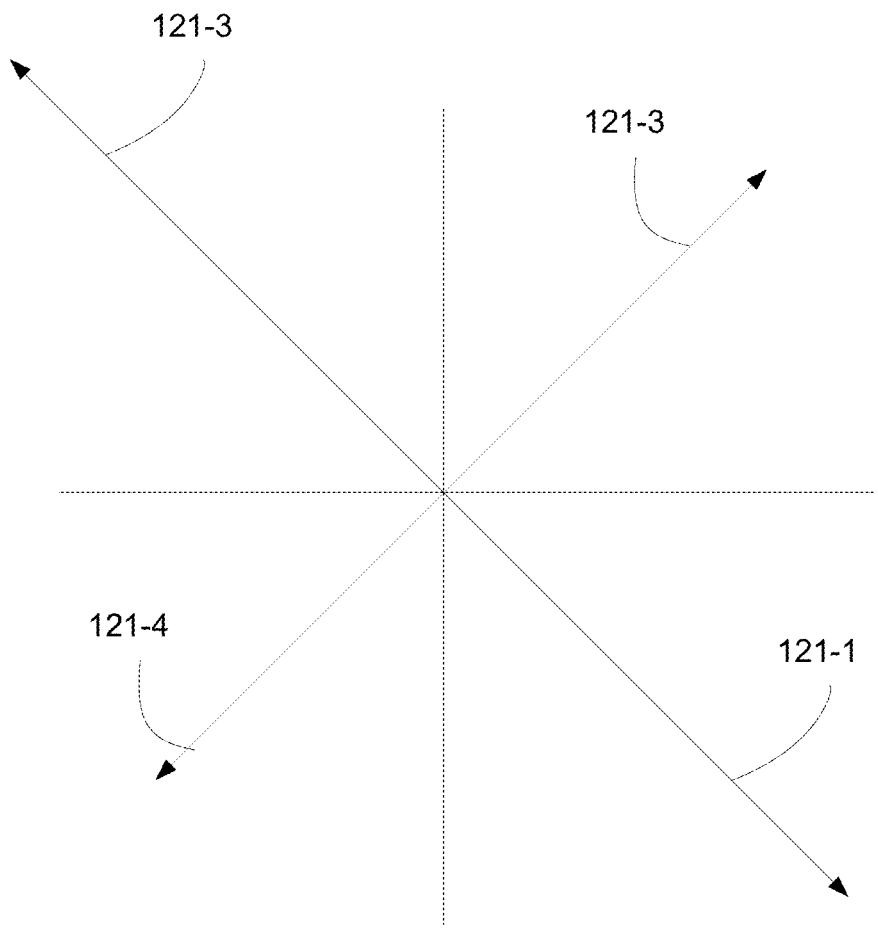
FIG. 15 is a graph of power cell phase voltages according to an embodiment.

FIG. 15 is a graph of power cell phase voltages 121 for the power cell switching of FIGS. 14A-D. The switching results in two opposite direct/quadrature vectors 121 that are equal in magnitude and 180 degrees out of phase. Phase voltage 121-1 is for the power cell switching of FIG. 14A, phase voltage 121-2 is for the power cell switching of FIG. 14B, phase voltage 121-3 is for the power cell switching of FIG. 14C, and phase voltage 121-4 is for the power cell switching of FIG. 14D. In one embodiment, there is no zero phase voltage vector.

Figure 16:
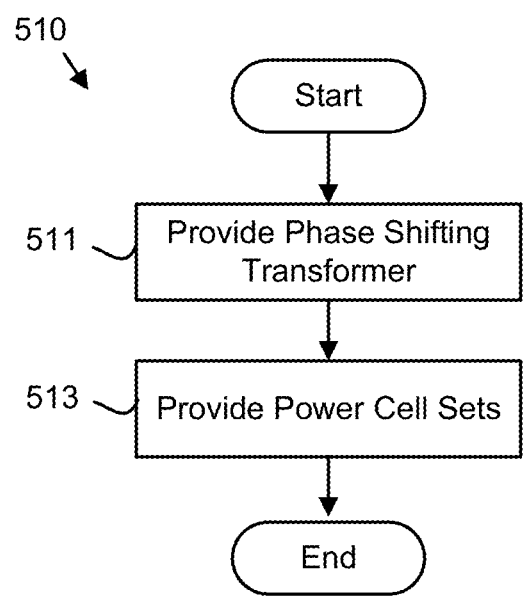
FIG. 16 is a flow chart diagram of a power supply method according to an alternate embodiment.

FIG. 16 is a flow chart diagram of a power supply method 510. The method 510 provides power to a load such as the motor 123 and may be performed by the power supply 100. The method 410 may provide 511 a transformer 105 that receives a three-phase primary voltage and steps the three-phase primary voltage up or down to a secondary voltage with a plurality of secondary winding sets 130 to a plurality of first phase voltages 131-1, a plurality of second phase voltages 131-2, and a plurality of third phase voltages 131-3.

The method 510 further provides 513 a plurality of power cell sets 115 that each comprise a plurality of power cells 110 cascaded connected. Each power cell 110 comprises a rectifier 150 and an inverter 155. The rectifier 150 comprises two first active switches 125b-1 that are serially connected and receive a phase voltage 131 at a first switch midpoint 133-1, two second active switches 125b-2 that are serially connected and receive another phase voltage 131 at a second switch midpoint 133-2, and two capacitors 195 that are serially connected and receive another phase voltage 131 at a capacitor midpoint 133-3 between the capacitors 195. The two first active switches 125b-1, the second two first active switches 125b-2, and the two capacitors 195 of each power cell 110 are connected in parallel.

Figure 17A:
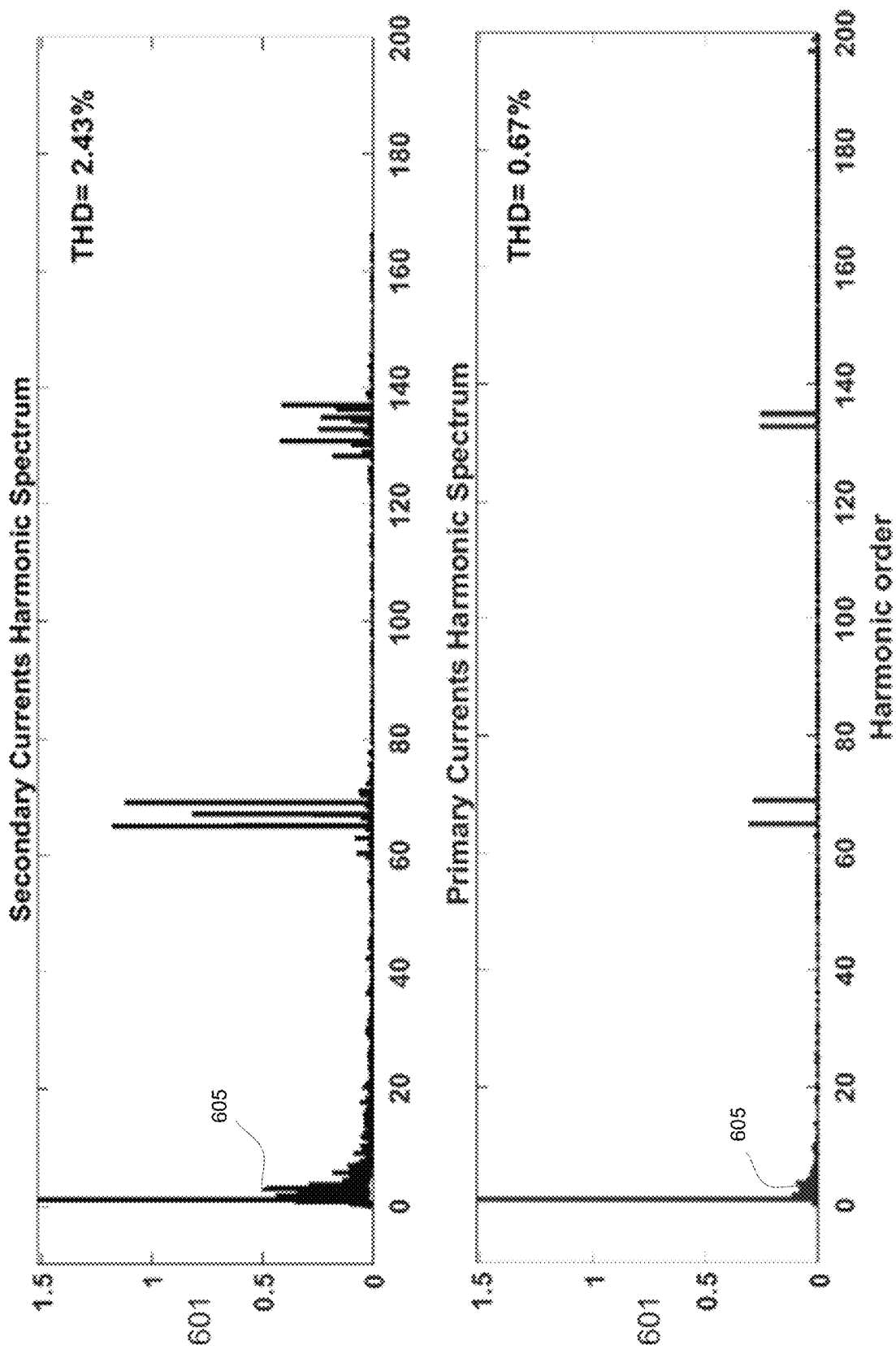
FIG. 17A is graphs of power supply harmonic spectrums according to an embodiment.

FIG. 17A is a graph of power supply harmonic spectrums for the power supply 100 of FIG. 12B. The switching frequency is 4020 Hz with the connections of Table 1. The carrier angles are the same for the rectifiers 150 in all power cells 110. The secondary currents harmonic spectrum for the secondary winding sets 130 and the primary currents harmonic spectrum for the primary winding 135 are shown as magnitudes 601 expressed as a percentage to the fundamental harmonic. The total harmonic distortion (THD) is also specified.

Figure 17B:
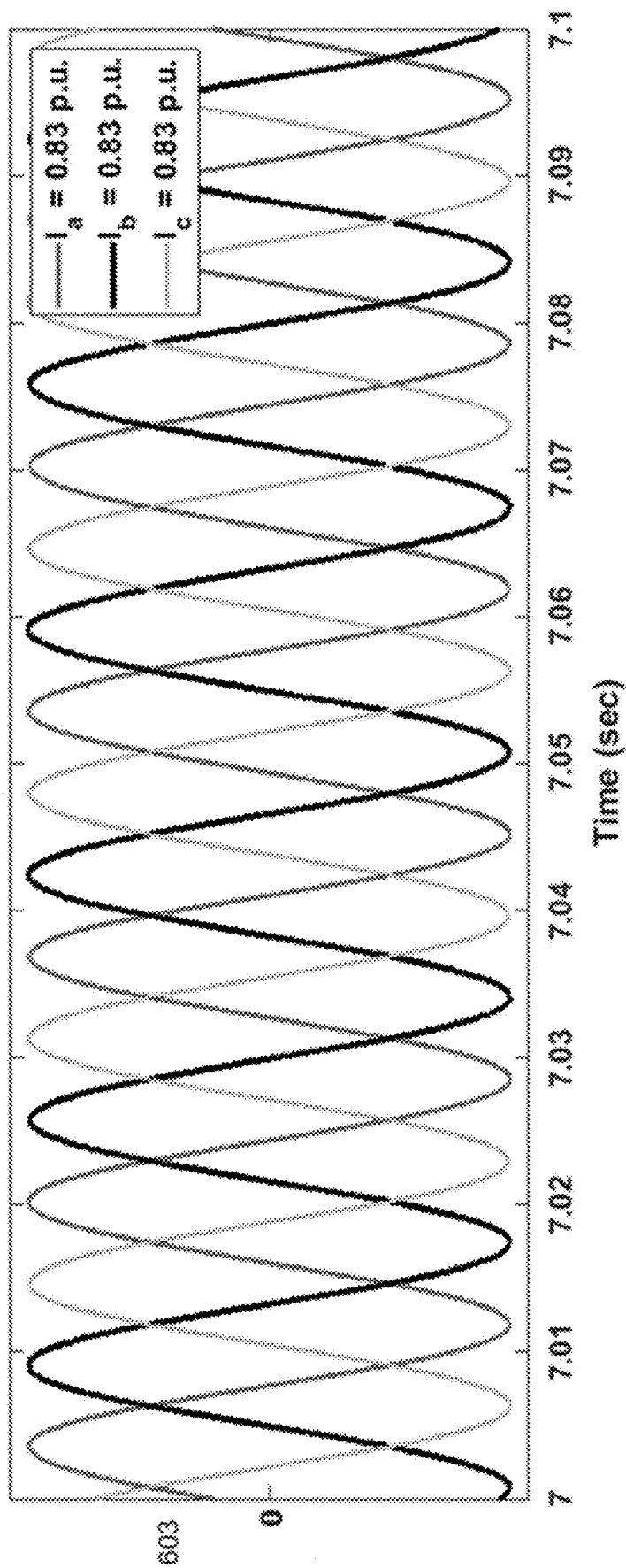
FIG. 17B is a graph of power supply output currents according to an embodiment.

FIG. 17B is graphs of power supply output currents Ia, Ib, and Ic for the AC outputs 160 of the power supply 100 of FIG. 12B. The currents 603 are measured per unit.

Figure 17C:
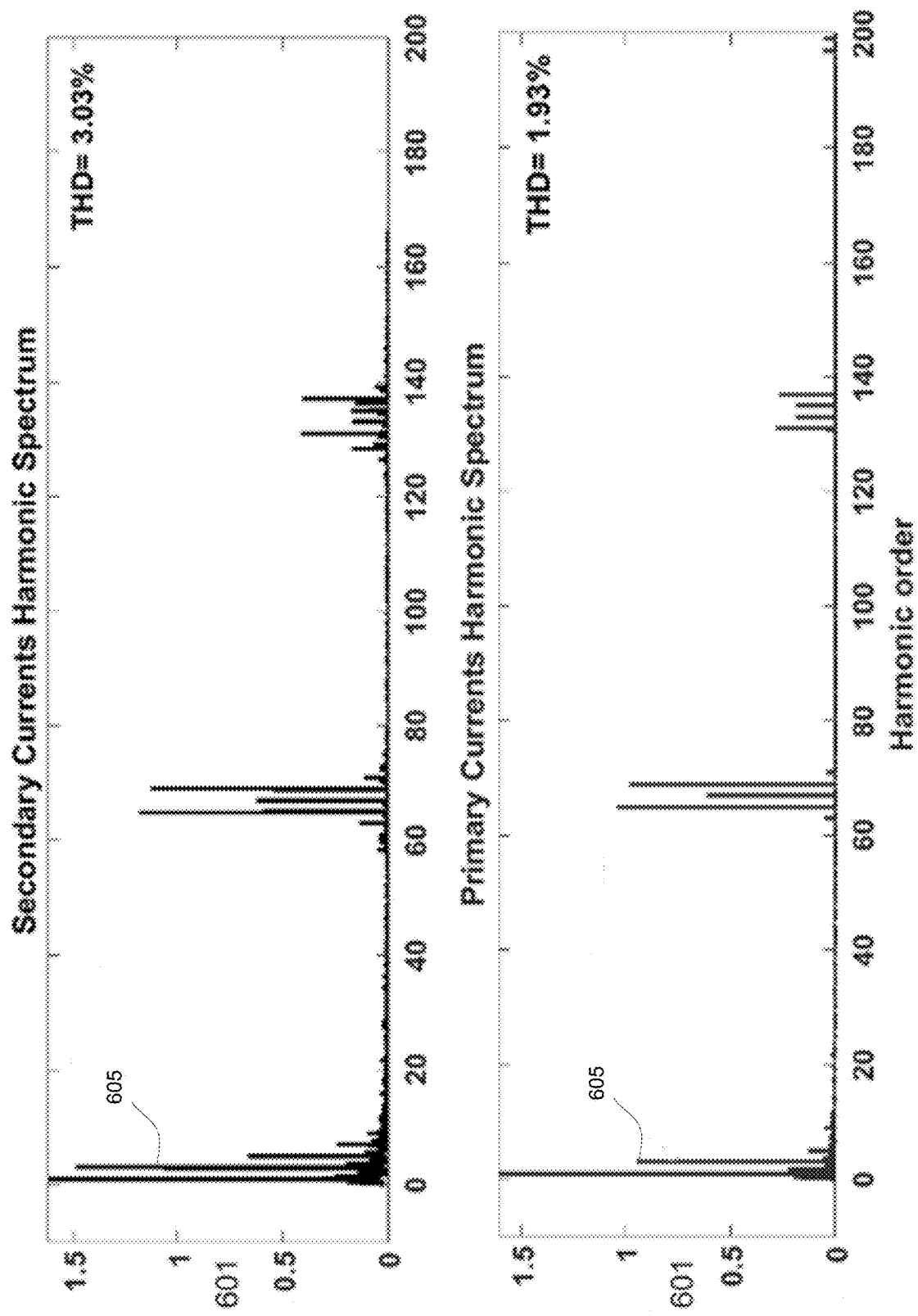
FIG. 17C is graphs of power supply harmonic spectrums according to an alternate embodiment.

FIG. 17C is graphs of power supply harmonic spectrums for the power supply 100 of FIG. 12B. The switching frequency is 4020 Hz with the connections of Table 2. The carrier angles are the same for the rectifiers 150 in all power cells 110. The secondary currents harmonic spectrum for the secondary winding sets 130 and the primary currents harmonic spectrum for the primary winding 135 are shown as magnitudes 601 expressed as a percentage to the fundamental harmonic. The THD is also specified.

Figure 17D:
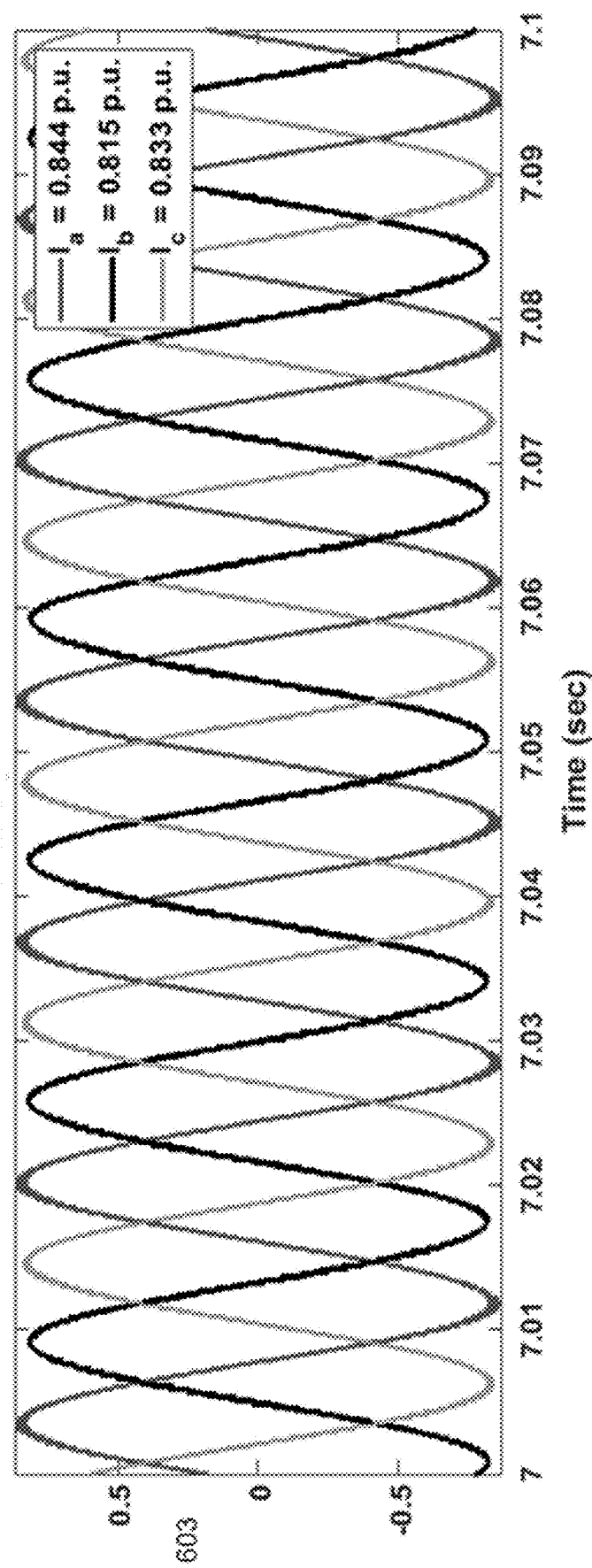
FIG. 17D is a graph of power supply output currents according to an alternate embodiment.

FIG. 17D is a graph of power supply output currents Ia, Ib, and Ic for the AC outputs 160 of the power supply 100 of FIG. 12B. The currents 603 are measured per unit.

Figure 17E:
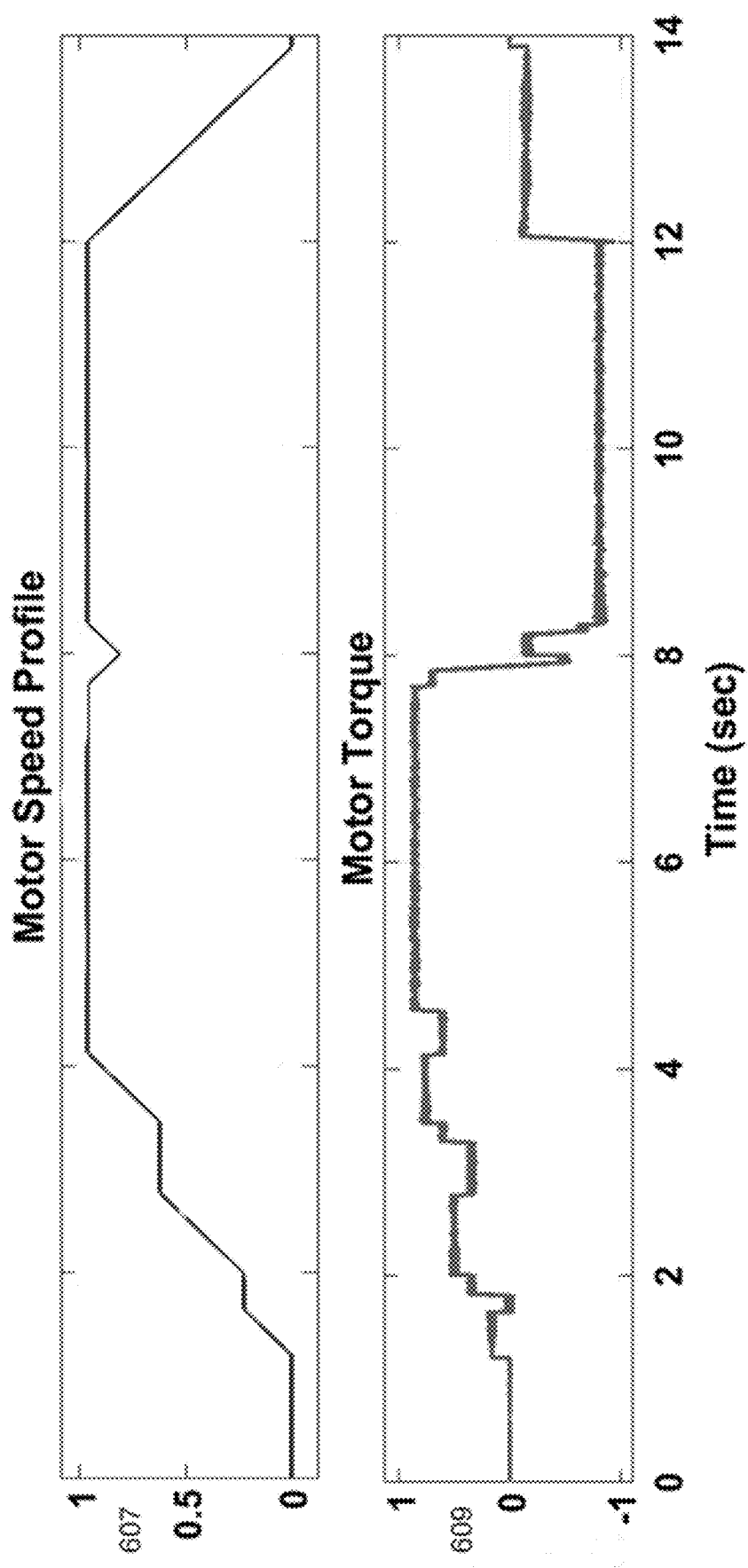
FIG. 17E are graphs of a motor speed profile and motor torque according to an embodiment.

FIG. 17E are graphs of a motor speed profile and motor torque for the motor 123 of FIG. 12B. The speed 607 measured in per unit and torque 609 measured in per unit are shown while motoring and during regeneration over a time interval.

Figure 17F:
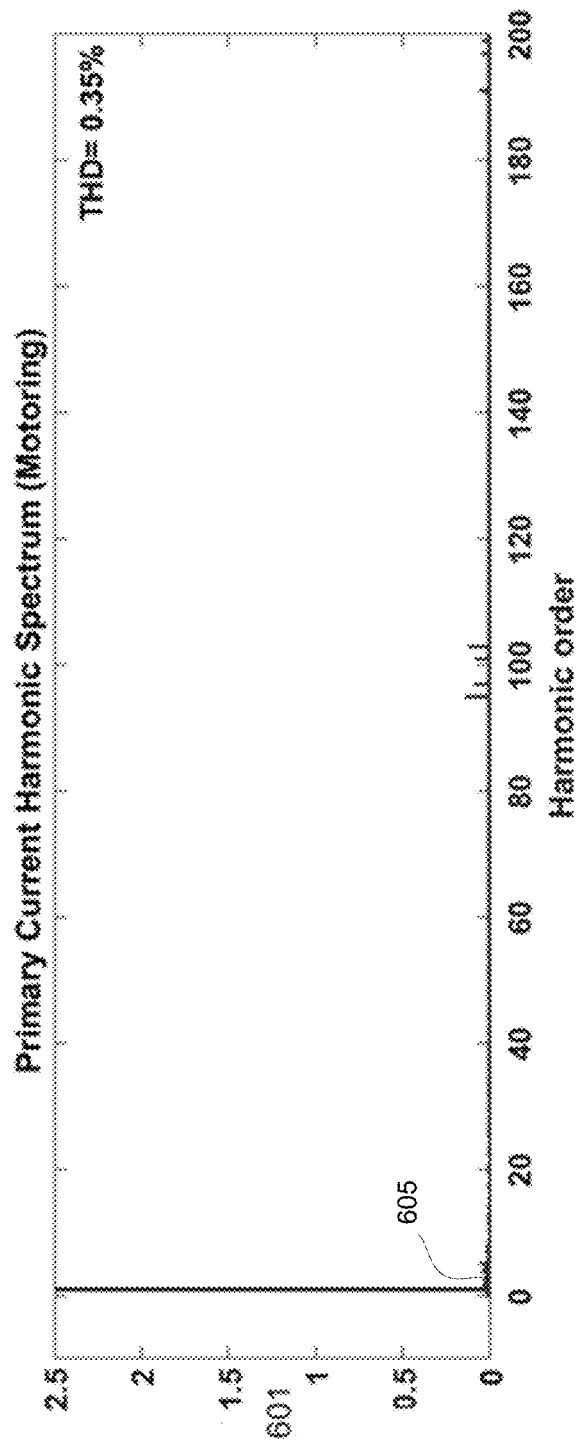
FIG. 17F is a graph of a power supply harmonic spectrum according to an embodiment.

FIG. 17F is a graph of a power supply harmonic spectrum for the power supply 100 of FIG. 12D during motoring. In the depicted embodiment, the switching frequency is 1980 Hz, the connection of table 4 is used, and the carrier angles for the rectifiers 150 in the power cell rows 113-1/2/3 are shifted by 120 degrees. The primary current harmonic spectrum for the primary winding 135 is shown as magnitudes 601 expressed as a percentage to the fundamental harmonic. The THD is also specified.

Figure 17G:
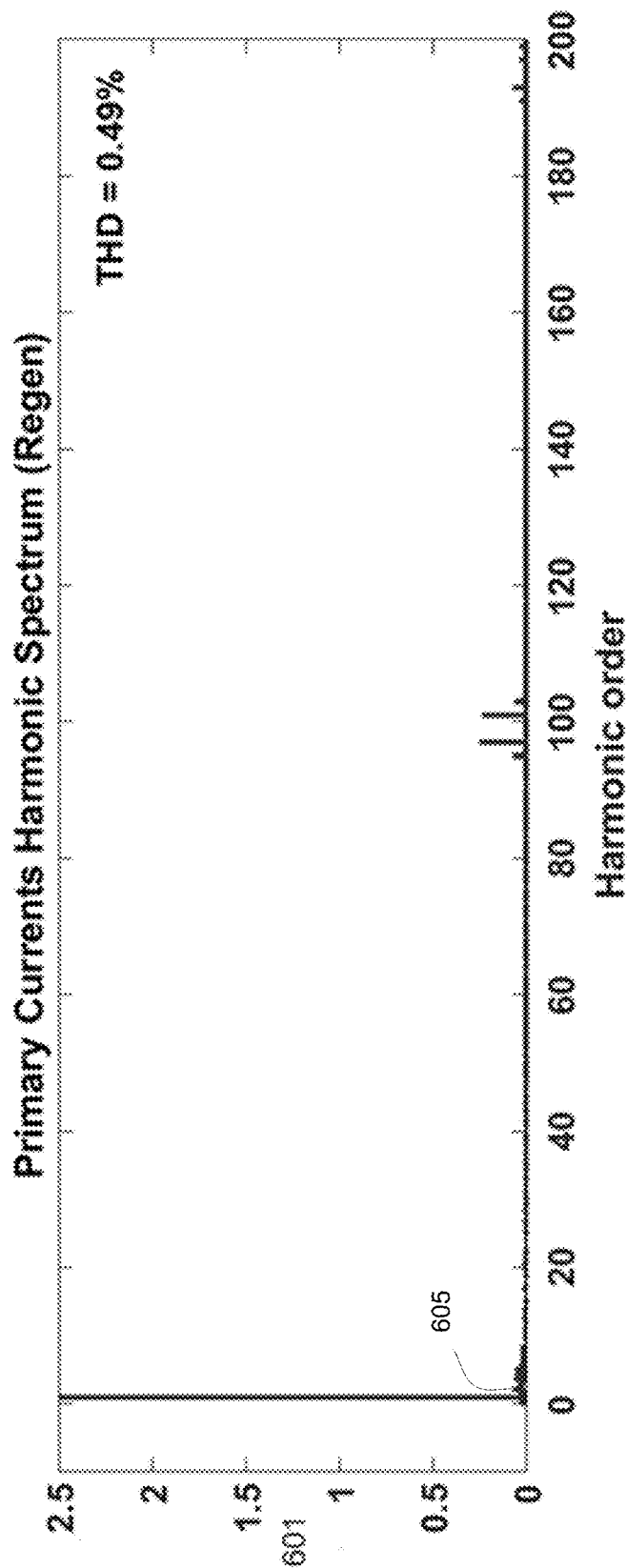
FIG. 17G is a graph of a power supply harmonic spectrum according to an embodiment.

FIG. 17G is a graph of a power supply harmonic spectrum for the power supply 100 of FIG. 12D during regeneration. In the depicted embodiment, the switching frequency is 1980 Hz, the connection of table 4 is used, and the carrier angles for the rectifiers 150 in the power cell rows 113-1/2/3 are shifted by 120 degrees. The primary current harmonic spectrum for the primary winding 135 is shown as magnitudes 601 expressed as a percentage to the fundamental harmonic. The THD is also specified.

Figure 17H:
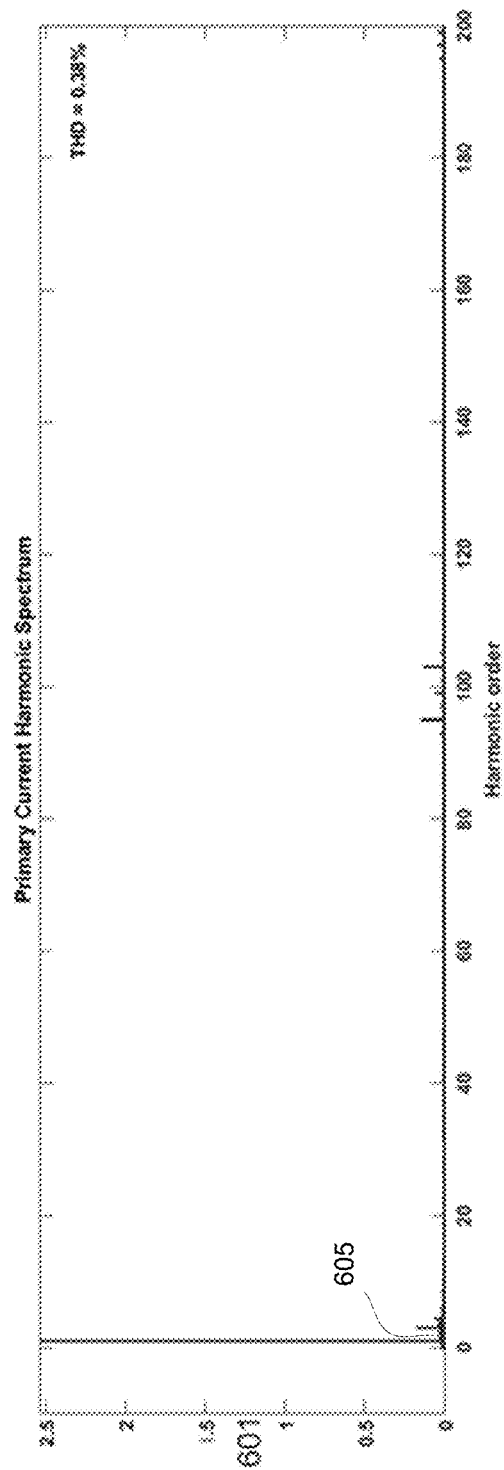
FIG. 17H is a graph of a power supply harmonic spectrum according to an alternate embodiment.

FIG. 17H is a graph of a power supply harmonic spectrum for the power supply 100 of FIG. 12B during motoring. The switching frequency is 1980 Hz, the connections of Table 3 are used, and the carrier angles for the rectifiers 150 in the power cells 110-1/2/3 are shifted by 120 degrees. The primary current harmonic spectrum for the primary winding 135 is shown as magnitudes 601 expressed as a percentage to the fundamental harmonic. The THD is also specified.

Figure 17I:
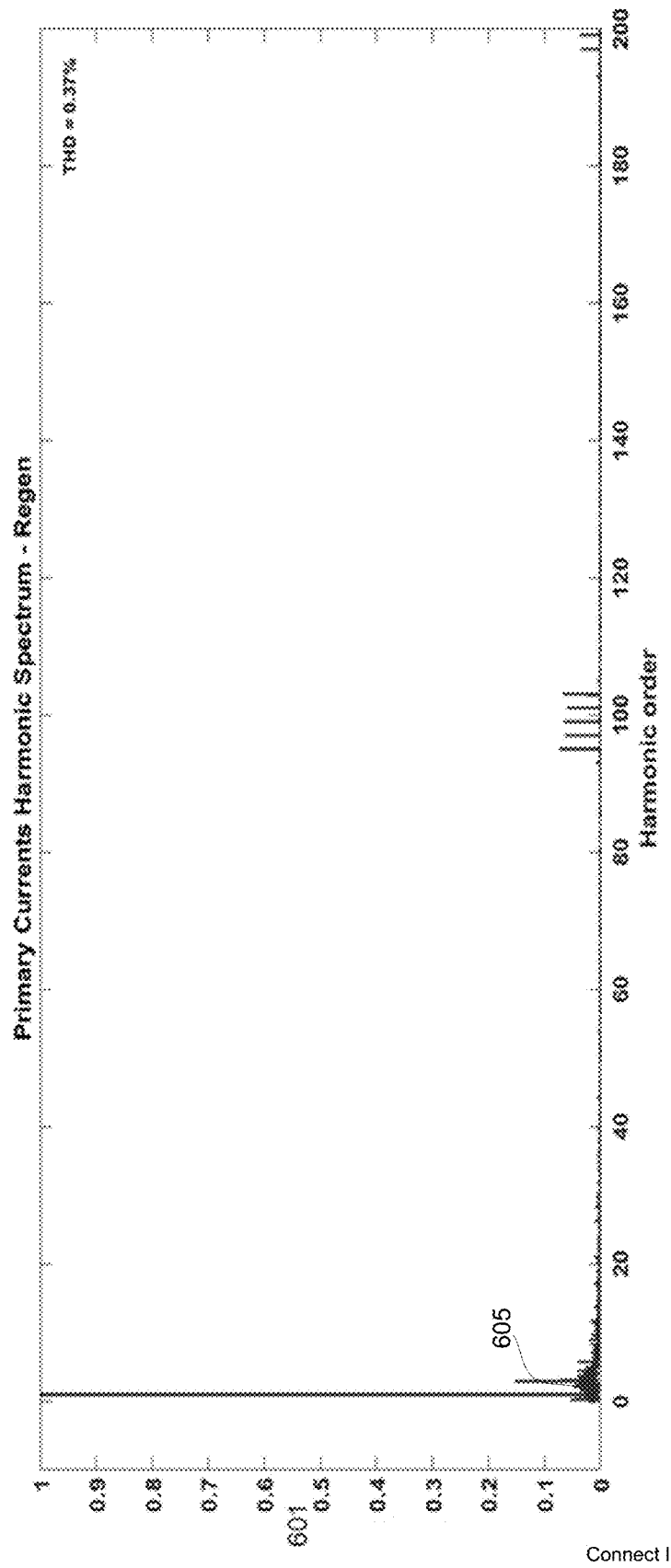
FIG. 17I is a graph of a power supply harmonic spectrum according to an alternate embodiment.

FIG. 17I is a graph of a power supply harmonic spectrum for the power supply 100 of FIG. 12B during regeneration. The switching frequency is 1980 Hz, the connections of Table 3 are used, and the carrier angles for the rectifiers 150 in the power cells 110-1/2/3 are shifted by 120 degrees. The primary current harmonic spectrum for the primary winding 135 is shown as magnitudes 601 expressed as a percentage to the fundamental harmonic. The THD is also specified.

Problem/Solution

The cost of a cascaded H bridge power supply 100 is significantly impacted by the number of power semiconductor devices 125 such as active switches 125b in each power cell 110. A cascaded H bridge power supply 100 may typically have at least six active switches 125b in the rectifier 150. Reducing the power semiconductor devices 125 significantly reduces the cost of the power supply 100. The embodiments employ power cells 110 with reduced active switches 125b in the rectifier 150. As a result, the embodiments enable regenerative power supplies 100 with significantly reduced cost.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power supply comprising:
a transformer that receives a three-phase primary voltage and steps the three-phase primary voltage up or down to a secondary voltage with a plurality of secondary winding sets to a plurality of first phase voltages, a plurality of second phase voltages, and a plurality of third phase voltages; and
a plurality of power cell sets that each comprise a plurality of power cells cascaded connected, wherein each power cell comprises a rectifier and an inverter, the rectifier comprising two first active switches that are serially connected and receive a phase voltage from a first secondary winding of a given secondary winding set at a first switch midpoint, two second active switches that are serially connected and receive another phase voltage from a second secondary winding of the given winding set at a second switch midpoint, and two capacitors in parallel with the rectifier and the inverter that are serially connected and receive another phase voltage from a third secondary winding of the given secondary winding set at a capacitor midpoint between the capacitors, wherein the two first active switches, the two second active switches, and the two capacitors of each power cell are connected in parallel.

2. The power supply of claim 1, wherein the active switches are switched as a first position with a first top active switch and second bottom active switch on, a second position with first top active switch and a second top active switch on, a third position with a second bottom active switch and second top active switch on, and a first bottom fourth position with active switch and second bottom active switch on.

3. The power supply of claim 1, wherein the inverter is an H-bridge of four active switches.

4. The power supply of claim 1, wherein the transformer comprises a primary winding, three power cell sets, and 3k secondary winding sets, a secondary phase shift is $$\delta = \frac{60}{k}$$

degrees between the secondary winding sets for each power cell set, and each power cell set comprises k power cells, wherein k is in integer.

5. The power supply of claim 4, wherein for first power cells, the first switch midpoint receives the second phase voltage from an (av) secondary winding set, the second switch midpoint receives the third phase voltage from an (aw) secondary winding set, and the capacitor midpoint receives the first phase voltage from an (au) secondary winding set, for second power cells, the first switch midpoint receives the third phase voltage from a (bw) secondary winding set, the second switch midpoint receives the first phase voltage from a (bu) secondary winding set, and the capacitor midpoint receives the second phase voltage from a (bv) secondary winding set, and for third power cells, the first switch midpoint receives the first phase voltage from a (cu) secondary winding set, the second switch midpoint receives the second phase voltage from a (cv) secondary winding set, and the capacitor midpoint receives the third phase voltage from a (cw) secondary winding set.

6. The power supply of claim 5, wherein k=3, the switching frequency is 4020 Hertz (Hz), the power cells are controlled with sinusoidal pulse width modulation control signals, and the carrier angle phase shifts are the same for the rectifiers in all power cells.

7. The power supply of claim 4, wherein for all power cells, the first switch midpoint, the second switch midpoint, and the third switch midpoint are connected in a same phase sequence.

8. The power supply of claim 7, wherein k=3, the switching frequency is 4020 Hz., and in all power cells the power cells, the first switch midpoint receives the same phase voltage from a u secondary winding set, the second switch midpoint receives the second phase voltage from a v secondary winding set, and the capacitor midpoint receives the third phase voltage from a w secondary winding set, the power cells are controlled with sinusoidal pulse width modulation control signals, and carrier angle phase shifts are the same for the rectifiers.

9. The power supply of claim 4, wherein there are k power cell rows, for a power cell row x, where x=3L−2 for L is integer and L=1 to the upper integer limit of $$\left(\frac{k}{3}\right),$$

the first switch midpoint receives the second phase voltage from an (av) secondary winding set, the second switch midpoint receives the third phase voltage from an (aw) secondary winding set, and the capacitor midpoint receives the first phase voltage from an (au) secondary winding set, for a power cell row y, where y is integer equals to x+1 and ranges from 2 to k, the first switch midpoint receives the third phase voltage from a (bw) secondary winding set, the second switch midpoint receives the first phase voltage from a (bu) secondary winding set, and the capacitor midpoint receives the second phase voltage from a (bv) secondary winding set, and for a power cell row z, where z is integer equals to x+2 and ranges from 3 to k, the first switch midpoint receives the first phase voltage from a (cu) secondary winding set, the second switch midpoint receives the second phase voltage from a (cv) secondary winding set, and the capacitor midpoint receives the third phase voltage from a (cw) secondary winding set.

10. The power supply of claim 9, wherein the power cells are controlled with sinusoidal pulse width modulation control signals, and carrier angles $\theta_1$, $\theta_2$, and $\theta_3$ for the rectifier in the power cells are phase shifted by 120 degrees.

11. The power supply of claim 10, wherein k=3 and the switching frequency is 1980 Hz.

12. The power supply of claim 1, wherein the transformer comprises a primary winding, three power cell sets, 3k secondary winding sets with no secondary phase shifts between the secondary winding sets, each power cell set comprises k power cells, and k is in integer.

13. The power supply of claim 12, wherein for first power cells, the first switch midpoint receives the second phase voltage from an (av) secondary winding set, the second switch midpoint receives the third phase voltage from an (aw) secondary winding set, and the capacitor midpoint receives the first phase voltage from an (au) secondary winding set, for second power cells, the first switch midpoint receives the third phase voltage from a (bw) secondary winding set, the second switch midpoint receives the first phase voltage from a (bu) secondary winding set, and the capacitor midpoint receives the second phase voltage from a (bv) secondary winding set, and for third power cells, the first switch midpoint receives the first phase voltage from a (cu) secondary winding set, the second switch midpoint receives the second phase voltage from a (cv) secondary winding set, and the capacitor midpoint receives the third phase voltage from a (cw) secondary winding set.

14. The power supply of claim 13, wherein the power cells are controlled with sinusoidal pulse width modulation control signals, carrier angles $\theta_n$ for the rectifiers for each power cell row are the same, the carrier phase shifting angles $\theta_1, \theta_2, \ldots, \theta_k$ of the rectifiers in different power cell rows are shifted by $$\frac{360}{k}$$

degrees from each other.

15. The power supply of claim 14, wherein k=3, switching frequency is 1980 Hz, and the carrier angles are $\theta_1$ for the first power cell row, $\theta_2=\theta_1\pm120°$ for the second power cell row, and $\theta_3=\theta_1\pm240°$ for the third power cell row.

16. The power supply of claim 1, wherein a distribution of phase voltages at the first switch midpoint, the second switch midpoint, and the capacitor midpoint reduces harmonics of a primary current harmonic spectrum.

17. An apparatus comprising:
a transformer generating a plurality of first phase voltages, a plurality of second phase voltages, and a plurality of third phase voltages; and
a plurality of power cell sets that each comprise a plurality of power cells cascaded connected, wherein each power cell comprises a rectifier and an inverter, the rectifier comprising two first active switches that are serially connected and receive a phase voltage from a first secondary winding of a given secondary winding set at a first switch midpoint, two second active switches that are serially connected and receive another phase voltage from a second secondary winding of the given winding set at a second switch midpoint, and two capacitors in parallel with the rectifier and the inverter that are serially connected and receive another phase voltage from a third secondary winding of the given secondary winding set at a capacitor midpoint between the capacitors, wherein the two first active switches, the two second active switches, and the two capacitors of each power cell are connected in parallel.

18. A method comprising:
providing a transformer that receives a three-phase primary voltage and steps the three-phase primary voltage up or down to a secondary voltage with a plurality of secondary winding sets to a plurality of first phase voltages, a plurality of second phase voltages, and a plurality of third phase voltages; and
providing a plurality of power cell sets that each comprise a plurality of power cells cascaded connected, wherein each power cell comprises a rectifier and an inverter, the rectifier comprising two first active switches that are serially connected and receive a phase voltage from a first secondary winding of a given secondary winding set at a first switch midpoint, two second active switches that are serially connected and receive another phase voltage from a second secondary winding of the given winding set at a second switch midpoint, and two capacitors in parallel with the rectifier and the inverter that are serially connected and receive another phase voltage from a third secondary winding of the given secondary winding set at a capacitor midpoint between the capacitors, wherein the two first active switches, the two second active switches, and the two capacitors of each power cell are connected in parallel.

19. A drive comprising:
a motor;
a power supply driving the motor, the power supply comprising:
a transformer that receives a three-phase primary voltage and steps the three-phase primary voltage up or down to a secondary voltage with a plurality of secondary winding sets to a plurality of first phase voltages, a plurality of second phase voltages, and a plurality of third phase voltages; and
a plurality of power cell sets that each comprise a plurality of power cells cascaded connected, wherein each power cell comprises a rectifier and an inverter, the rectifier comprising two first active switches that are serially connected and receive a phase voltage from a first secondary winding of a given secondary winding set at a first switch midpoint, two second active switches that are serially connected and receive another phase voltage from a second secondary winding of the given winding set at a second switch midpoint, and two capacitors in parallel with the rectifier and the inverter that are serially connected and receive another phase voltage from a third secondary winding of the given secondary winding set at a capacitor midpoint between the capacitors, wherein the two first active switches, the two second active switches, and the two capacitors of each power cell are connected in parallel.

* * * * *